US010616601B2

(12) United States Patent
Naing et al.

(10) Patent No.: US 10,616,601 B2
(45) Date of Patent: *Apr. 7, 2020

(54) METHODS AND APPARATUSES FOR ENCODING AND DECODING VIDEO USING TEMPORAL MOTION VECTOR PREDICTION

(71) Applicant: Sun Patent Trust, New York, NY (US)

(72) Inventors: Sue Mon Thet Naing, San Jose, CA (US); Viktor Wahadaniah, Singapore (SG); Chong Soon Lim, Singapore (SG); Hai Wei Sun, Singapore (SG); Kyaw Kyaw Win, Singapore (SG); Takahiro Nishi, Nara (JP); Hisao Sasai, Osaka (JP); Youji Shibahara, Tokyo (JP); Toshiyasu Sugio, Osaka (JP); Kyoko Tanikawa, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/138,503

(22) Filed: Sep. 21, 2018

(65) Prior Publication Data
US 2019/0028734 A1    Jan. 24, 2019

Related U.S. Application Data

(63) Continuation of application No. 15/373,856, filed on Dec. 9, 2016, now Pat. No. 10,129,563, which is a
(Continued)

(51) Int. Cl.
H04N 19/159      (2014.01)
H04N 19/70       (2014.01)
(Continued)

(52) U.S. Cl.
CPC ......... *H04N 19/52* (2014.11); *H04N 19/105* (2014.11); *H04N 19/159* (2014.11); *H04N 19/31* (2014.11);
(Continued)

(58) Field of Classification Search
CPC .... H04N 19/61; H04N 19/577; H04N 19/159; H04N 19/70; H04N 19/31; H04N 19/52; H04N 19/157
(Continued)

(56) References Cited

U.S. PATENT DOCUMENTS 7,643,559 B2   1/2010 Kato et al.
8,374,245 B2   2/2013 Tourapis et al.
(Continued)

FOREIGN PATENT DOCUMENTS

CN      1917647        2/2007
CN      101156451      4/2008
(Continued)

OTHER PUBLICATIONS

Office Action issued for Indian Patent Application No. 6462/CHENP/2013 dated Mar. 29, 2019.
(Continued)

Primary Examiner — Jared Walker
(74) Attorney, Agent, or Firm — Wenderoth, Lind & Ponack, L.L.P.

(57) ABSTRACT

A method of encoding a video into a coded video bitstream with temporal motion vector prediction comprises: determining a value of a flag for indicating whether temporal motion vector prediction is used or not used for the inter-picture prediction of a sub-picture unit of a picture; and writing the flag having the value into a header of the sub-picture unit or a header of the picture; wherein if the flag indicates that temporal motion vector prediction is used, the
(Continued)

method further comprises: creating a first list of motion vector predictors comprising a plurality of motion vector predictors including at least one temporal motion vector predictor derived from at least one motion vector from a collocated reference picture; selecting a motion vector predictor out of the first list; and writing a first parameter into the coded video bitstream for indicating the selected motion vector predictor out of the first list.

2 Claims, 20 Drawing Sheets

Related U.S. Application Data continuation of application No. 14/372,377, filed as application No. PCT/JP2013/000150 on Jan. 16, 2013, now Pat. No. 9,591,328.

(60) Provisional application No. 61/589,261, filed on Jan. 20, 2012.

(51) Int. Cl.
*H04N 19/46* (2014.01)
*H04N 19/184* (2014.01)
*H04N 19/52* (2014.01)
*H04N 19/577* (2014.01)
*H04N 19/31* (2014.01)
*H04N 19/61* (2014.01)
*H04N 19/105* (2014.01)

(52) U.S. Cl.
CPC .......... *H04N 19/46* (2014.11); *H04N 19/577* (2014.11); *H04N 19/61* (2014.11); *H04N 19/70* (2014.11); *H04N 19/184* (2014.11)

(58) Field of Classification Search
USPC ................................... 375/240.16
See application file for complete search history.

(56) References Cited

U.S. PATENT DOCUMENTS

| | | |
|---|---|---|
| 8,494,046 B2 | 7/2013 | Yang |
| RE44,680 E | 12/2013 | Yang |
| 9,210,440 B2 | 12/2015 | Sugio et al. |
| 2002/0181591 A1 | 12/2002 | Francois et al. |
| 2004/0001546 A1 | 1/2004 | Tourapis et al. |
| 2004/0013308 A1 | 1/2004 | Jeon et al. |
| 2004/0052507 A1 | 3/2004 | Kondo et al. |
| 2004/0136461 A1 | 7/2004 | Kondo et al. |
| 2004/0190614 A1 | 9/2004 | Schlockermann et al. |
| 2004/0190615 A1 | 9/2004 | Abe et al. |
| 2005/0141612 A1 | 6/2005 | Abe et al. |
| 2006/0126952 A1 | 6/2006 | Suzuki et al. |
| 2006/0233254 A1 | 10/2006 | Lee et al. |
| 2006/0262981 A1 | 11/2006 | Jeon et al. |
| 2007/0177671 A1 | 8/2007 | Yang |
| 2007/0177672 A1 | 8/2007 | Yang |
| 2007/0177673 A1 | 8/2007 | Yang |
| 2007/0177674 A1 | 8/2007 | Yang |
| 2007/0177810 A1 | 8/2007 | Yang |
| 2007/0177811 A1 | 8/2007 | Yang |
| 2007/0177812 A1 | 8/2007 | Yang |
| 2007/0177813 A1 | 8/2007 | Yang |
| 2007/0268971 A1 | 11/2007 | Kato |
| 2007/0286281 A1 | 12/2007 | Tsuchiya et al. |
| 2008/0037636 A1 | 2/2008 | Jeon et al. |
| 2008/0037645 A1 | 2/2008 | Jeon et al. |
| 2008/0037646 A1 | 2/2008 | Jeon et al. |
| 2008/0037885 A1 | 2/2008 | Jeon et al. |
| 2008/0037886 A1 | 2/2008 | Jeon et al. |
| 2008/0043849 A1 | 2/2008 | Jeon et al. |
| 2008/0044093 A1 | 2/2008 | Jeon et al. |
| 2008/0044094 A1 | 2/2008 | Jeon et al. |
| 2008/0063075 A1 | 3/2008 | Kondo et al. |
| 2008/0069235 A1 | 3/2008 | Abe et al. |
| 2008/0123947 A1 | 5/2008 | Moriya et al. |
| 2008/0123977 A1 | 5/2008 | Moriya et al. |
| 2008/0130747 A1 | 6/2008 | Moriya et al. |
| 2008/0130988 A1 | 6/2008 | Moriya et al. |
| 2008/0130989 A1 | 6/2008 | Moriya et al. |
| 2008/0130990 A1 | 6/2008 | Moriya et al. |
| 2008/0137744 A1 | 6/2008 | Moriya et al. |
| 2008/0137748 A1 | 6/2008 | Kondo et al. |
| 2008/0159641 A1 | 7/2008 | Moriya et al. |
| 2008/0165849 A1 | 7/2008 | Moriya et al. |
| 2008/0192827 A1 | 8/2008 | Beric et al. |
| 2008/0267287 A1 | 10/2008 | Hannuksela |
| 2009/0010323 A1 | 1/2009 | Su et al. |
| 2009/0016439 A1 | 1/2009 | Thoreau et al. |
| 2009/0028249 A1 | 1/2009 | Gomila et al. |
| 2009/0034856 A1 | 2/2009 | Moriya et al. |
| 2009/0034857 A1 | 2/2009 | Moriya et al. |
| 2009/0052529 A1 | 2/2009 | Kim et al. |
| 2009/0123066 A1 | 5/2009 | Moriya et al. |
| 2009/0141814 A1 | 6/2009 | Yin et al. |
| 2009/0168874 A1 | 7/2009 | Su et al. |
| 2009/0310676 A1 | 12/2009 | Yang |
| 2010/0098157 A1 | 4/2010 | Yang |
| 2010/0189173 A1 | 7/2010 | Chen |
| 2010/0202539 A1 | 8/2010 | Kondo et al. |
| 2010/0215093 A1 | 8/2010 | Schlockermann et al. |
| 2010/0278267 A1 | 11/2010 | Lai et al. |
| 2011/0038419 A1 | 2/2011 | Han et al. |
| 2011/0096835 A1 | 4/2011 | Lim et al. |
| 2011/0170602 A1 | 7/2011 | Lee |
| 2011/0176611 A1 | 7/2011 | Huang et al. |
| 2011/0255598 A1 | 10/2011 | Lin et al. |
| 2011/0255600 A1 | 10/2011 | Lin et al. |
| 2012/0008688 A1 | 1/2012 | Tsai et al. |
| 2012/0027097 A1 | 2/2012 | Lin et al. |
| 2012/0063514 A1 | 3/2012 | Lin et al. |
| 2012/0121015 A1 | 5/2012 | Yang |
| 2012/0128060 A1 | 5/2012 | Lin et al. |
| 2012/0147964 A1 | 6/2012 | Schlockermann et al. |
| 2012/0207220 A1 | 8/2012 | Kim et al. |
| 2012/0207221 A1 | 8/2012 | Aono et al. |
| 2012/0224643 A1 | 9/2012 | Wang et al. |
| 2012/0257674 A1 | 10/2012 | Macq |
| 2012/0269265 A1 | 10/2012 | Macq |
| 2012/0287999 A1 | 11/2012 | Li et al. |
| 2012/0328024 A1 | 12/2012 | Kondo et al. |
| 2013/0016788 A1 | 1/2013 | Oh |
| 2013/0107958 A1 | 5/2013 | Shimada et al. |
| 2013/0114722 A1 | 5/2013 | Koyama et al. |
| 2013/0156108 A1 | 6/2013 | Jeon et al. |
| 2013/0163672 A1 | 6/2013 | Jeon et al. |
| 2013/0177076 A1 | 7/2013 | Itani et al. |
| 2013/0188721 A1 | 7/2013 | Jeong et al. |
| 2013/0188722 A1 | 7/2013 | Jeon et al. |
| 2013/0195192 A1 | 8/2013 | Jeon et al. |
| 2013/0202045 A1 | 8/2013 | Jeon et al. |
| 2013/0202046 A1 | 8/2013 | Jeon et al. |
| 2013/0208800 A1 | 8/2013 | Jeon et al. |
| 2013/0208993 A1 | 8/2013 | Jeon et al. |
| 2013/0242048 A1 | 9/2013 | Yin et al. |
| 2013/0251034 A1 | 9/2013 | Kim et al. |
| 2013/0259125 A1 | 10/2013 | Kim et al. |
| 2013/0272375 A1 | 10/2013 | Yu et al. |
| 2014/0064375 A1 | 3/2014 | Kondo et al. |
| 2014/0064376 A1 | 3/2014 | Kondo et al. |
| 2014/0072046 A1 | 3/2014 | Kondo et al. |
| 2014/0072047 A1 | 3/2014 | Kondo et al. |
| 2014/0105297 A1 | 4/2014 | Jeon et al. |
| 2015/0030077 A1 | 1/2015 | Jeon et al. |
| 2015/0030078 A1 | 1/2015 | Jeon et al. |
| 2015/0030079 A1 | 1/2015 | Jeon et al. |
| 2015/0030080 A1 | 1/2015 | Jeon et al. |
| 2015/0131724 A1 | 5/2015 | Lin et al. |
| 2015/0131736 A1 | 5/2015 | Kondo et al. |
| 2015/0172701 A1 | 6/2015 | Kondo et al. |

(56) References Cited

U.S. PATENT DOCUMENTS

| | | |
|---|---|---|
| 2015/0245032 A1 | 8/2015 | Itani et al. |
| 2015/0245035 A1 | 8/2015 | Itani et al. |
| 2015/0245057 A1 | 8/2015 | Itani et al. |
| 2015/0281725 A1 | 10/2015 | Itani et al. |
| 2016/0100185 A1 | 4/2016 | Kondo et al. |
| 2016/0112716 A1 | 4/2016 | Kondo et al. |
| 2016/0330440 A1 | 11/2016 | Abe et al. |
| 2016/0330441 A1 | 11/2016 | Abe et al. |
| 2017/0048544 A1 | 2/2017 | Kondo et al. |
| 2017/0048545 A1 | 2/2017 | Kondo et al. |
| 2017/0048546 A1 | 2/2017 | Kondo et al. |
| 2017/0048547 A1 | 2/2017 | Kondo et al. |
| 2017/0085907 A1 | 3/2017 | Kondo et al. |
| 2017/0180749 A1 | 6/2017 | Sugio et al. |
| 2017/0264894 A1 | 9/2017 | Abe et al. |
| 2017/0302955 A1 | 10/2017 | Kondo et al. |
| 2017/0302956 A1 | 10/2017 | Kondo et al. |
| 2017/0302957 A1 | 10/2017 | Kondo et al. |
| 2017/0324976 A1 | 11/2017 | Kondo et al. |
| 2018/0124393 A1 | 5/2018 | Abe et al. |
| 2018/0376136 A1 | 12/2018 | Abe et al. |

FOREIGN PATENT DOCUMENTS

| | | |
|---|---|---|
| CN | 101557461 | 10/2009 |
| CN | 101641954 | 2/2010 |
| CN | 102223542 | 10/2011 |
| EP | 0 817 491 | 3/2002 |
| EP | 2 009 923 | 12/2008 |
| EP | 2 117 234 | 11/2009 |
| EP | 2 309 750 | 4/2011 |
| JP | 2009-522986 | 6/2009 |
| JP | 2009-536793 | 10/2009 |
| JP | 2009-296605 | 12/2009 |
| JP | 2011-10197 | 1/2011 |
| JP | 2011-509053 | 3/2011 |
| JP | 2011-193352 | 9/2011 |
| JP | 2013-59024 | 3/2013 |
| JP | 2013-98745 | 5/2013 |
| JP | 2013-102273 | 5/2013 |
| KR | 10-2008-0031519 | 4/2008 |
| RU | 2 360 375 | 2/2008 |
| RU | 2 368 095 | 9/2009 |
| TW | 201125369 | 7/2011 |
| TW | 201216717 | 4/2012 |
| WO | 2004/040915 | 5/2004 |
| WO | 2004/071099 | 8/2004 |
| WO | 2005/081541 | 9/2005 |
| WO | 2006/000504 | 1/2006 |
| WO | 2007/081926 | 7/2007 |
| WO | 2010/109904 | 9/2010 |
| WO | 2011/046008 | 4/2011 |
| WO | 2013/154673 | 10/2013 |

OTHER PUBLICATIONS

Office Action issued for European Patent Application No. 13 757 485.1 dated Mar. 14, 2019.
Office Action dated May 3, 2019 in U.S. Appl. No. 16/233,470.
International Search Report dated Apr. 9, 2013 in corresponding International Application No. PCT/JP2013/000150.
International Standard, ISO/IEC 14496-10, "Information technology—Coding of audio-visual objects—Part 10: Advanced Video Coding", Second Edition, Oct. 1, 2004, pp. 1-267.
Bin Li et al., "High-level Syntax: Marking process for non-TMVP pictures", Joint Collaborative Team on Video Coding (JCT-VC) of ITU-T SG 16 WP3 and ISO/IEC JTC1/SC29/WG11 7th meeting, Geneva, CH, Nov. 21-30, 2011, JCTVC-G398, pp. 1-4.
Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-G1103_d6, Ver. 9, pp. 1-203.

Bin Li et al., "High-level Syntax: Temporal Information Decoding Refresh", Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F201, pp. 1-3.
Chong Soon Lim et al., "High-level Syntax: Proposed fix on signaling of TMVP disabling flag", Joint Collaborative Team on Video Coding (JCT-VC) of ITU-T SG16 WP3 and ISO/IEC JTC 1/SC 29/WG 11, 9th Meeting: Geneva, CH, Apr. 27-May 7, 2012, JCTVC-I0420, pp. 1-6.
Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-G1103_d9, Ver. 10, pp. 1-214.
"Advanced Video Coding for Generic Audiovisual Services", ITU-T Recommendation H. 264, Mar. 2010.
Viktor Wahadaniah et el., "AHG14/AHG15/non-CE9: Loss robustness issue in TMVP disabling", Joint Collaborative Team on Video Coding (JCT-VC) of ITU-T SG16 WP3 and ISO/IEC JTC1/SC29/WG11, $8^{th}$ Meeting: San Jose, CA, USA, JCTVC-H0570-r2, ITU-T. Feb. 8, 2012, p. 1-4.
Benjamin Bross et al., "High efficiency video coding (HEVC) text specification draft 6", Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-H1003, Ver.20, pp. 1-124.
Viktor Wahadaniah et al., "AHG14/AHG15/non-CE9: Loss robustness issue in TMVP disabling", Joint Collaborative Team on Video Coding (JCT-VC) of ITU-T SG16 WP3 and ISO/IEC JTC1/SC29/WG11, 8th Meeting: San Jóse, CA, USA, Feb. 1-10, 2012, [JCTVC-H0570], URL, http://phenix.int-evry.fr/jct/, Jan. 27, 2012, pp. 1-3.
Iain E. G. Richardson, "H.264 and MPEG-4 Video Compression", 2003, John Wiley & Sons, Chapter 6, p. 1-66.
Bin Li et al., "Constrained temporal motion vector prediction for error resilience", Joint Collaborative Team on Video Coding (JCT-VC) of ITU-T SG16 WP3 and ISO/IEC JTC1/SC29/WG11, 4th Meeting: Daegu, KR, Jan. 20-28, 2011, JCTVC-D139], pp. 1-4.
Jian-Liang Lin et al., "Syntax for AMVP Parsing Error Control", Joint Collaborative Team on Video Coding (JCT-VC) of ITU-T SG16 WP3 and ISO/IEC JTC1/SC29/WG11, 4th Meeting; Daegu, KR, Jan. 20-28, 2011, [JCTVC-D126], pp. 1-3.
Bin Li et al., "High-level Syntax: Marking process for non-TMVP pictures", Joint Collaborative Team on Video Coding (JCT-VC) of ITU-T SG16 WP3 and ISO/IEC JTC1/SC29/WG11, 7th Meeting; Geneva, CH, Nov. 21-30, 2011, [JCTVC-G398], Nov. 22, 2011, pp. 1-4.
Bin Li et al., "An investigation on robust parsing", Joint Collaborative Team on Video Coding (JCT-VC) of ITU-T SG16 WP3 and ISO/IEC JTC1/SC29/WG11, 5th Meeting; Geneva, CH, Mar. 16-23, 2011, [JCTVC-E148], pp. 1-6.
International Search Report dated May 14, 2013 in International Application No. PCT/JP2013/001198.
International Search Report dated Apr. 9, 2013 in International Application No. PCT/JP2013/000465.
Extended European Search Report dated May 4, 2015 in European Patent Application No. 13738409.5.
Alexis Michael Tourapis et al., "Direct Mode Coding for Bipredictive Slices in the H.264 Standard", IEEE Transactions on Circuits and Systems for Video Technology, vol. 15, No. 1, pp. 119-126, Jan. 1, 2005, XP011124673.
Bin Li et al., "Constrained temporal motion vector prediction for error resilience", Joint Collaborative Team on Video Coding (JCT-VC) of ITU-T SG16 WP3 and ISO/IEC JTC1/SC29/WG11, JCTVC-D139, Ver. 1, 4th Meeting: Daegu, KR, Jan. 20-28, 2011, XP030008179.
Jian-Liang Lin et al., "Parsing Error Control for Advanced Motion Vector Prediction", Joint Collaborative Team on Video Coding (JCT-VC) of ITU-T SG16 WP3 and ISO/IEC JTC1/SC29/WG11, JCTVC-D126, Ver. 1, 4th Meeting: Daegu, KR, Jan. 20-28, 2011, XP030008166.
Benjamin Bross et al., "WD5: Working Draft 5 of High-Efficiency Video Coding", Joint Collaborative Team on Video Coding (JCT-

(56) References Cited

OTHER PUBLICATIONS

VC) of ITU-T SG16 WP3 and ISO/IEC JTC1/SC29/WG11, JCTVC-G1103_d0, Ver. 1, 7th Meeting: Geneva, CH, Nov. 21-30, 2011, XP030111032.
Tamhankar et al., "An overview of H.264/MPEG-4 Part 10", 2003, University of Texas, EE Dept., EC-VIP-MC, Jul. 2003, 4th EURASIP Conference, pp. 1-51.
Extended European Search Report dated Jan. 18, 2016 in European Patent Application No. 13757485.1.
Lee T et al., "Syntax cleanup", Joint Collaborative Team on Video Coding (JCT-VC) of ITU-T SG16 WP3 and ISO/IEC JTC1/SC29/WG11, JCTVC-I0127, 9th Meeting: Geneva, CH, Apr. 27-May 7, 2012, XP030111890.
Yu Y et al., "Modifications on signaling collocated picture", Joint Collaborative Team on Video Coding (JCT-VC) of ITU-T SG16 WP3 and ISO/IEC JTC1/SC29/WG11, JCTVC-I0266, 9th Meeting: Geneva, CH, Apr. 27-May 7, 2012, XP030112029.
Bin Li et al., "High-level Syntax: Marking process for non-TMVP pictures", Joint Collaborative Team on Video Coding (JCT-VC) of ITU-T SG16 WP3 and ISO/IEC JTC1/SC29/WG11, JCTVC-G398, 7th Meeting: Geneva, CH, Nov. 21-30, 2011, XP030110382.
Sang-Heon Lee et al., "Disparity vector prediction methods in MVC", Joint Video Team (JVT) of ISO/IEC MPEG & ITU-T VCEG (ISO/IEC JTC1/SC29/WG11 and ITU-T SG16 Q.6), JVT-U040r1, 21st Meeting: Hangzhou, CN, Oct. 20-27, 2006, XP007913064.
Impress standard textbook series, H.264/AVC Textbook, Aug. 11, 2004, with Partial translation.
Extended European Search Report dated May 4, 2016 in European Patent Application No. 13743026.0.
Office Action dated Oct. 18, 2016 in corresponding Chinese Application No. 201380005801.0 (with English translation of Search Report).
Office Action dated May 5, 2016 in U.S. Appl. No. 14/372,377.
Notice of Allowance dated Nov. 14, 2016 in U.S. Appl. No. 13/924,965.
Office Action dated Feb. 9, 2018 in U.S. Appl. No. 15/260,529.
Office Action dated Nov. 11, 2019 in European Patent Application No. 13743026.0.
Office Action dated Feb. 3, 2020 in European Patent Application No. 13743026.0.

Stream of TS packets

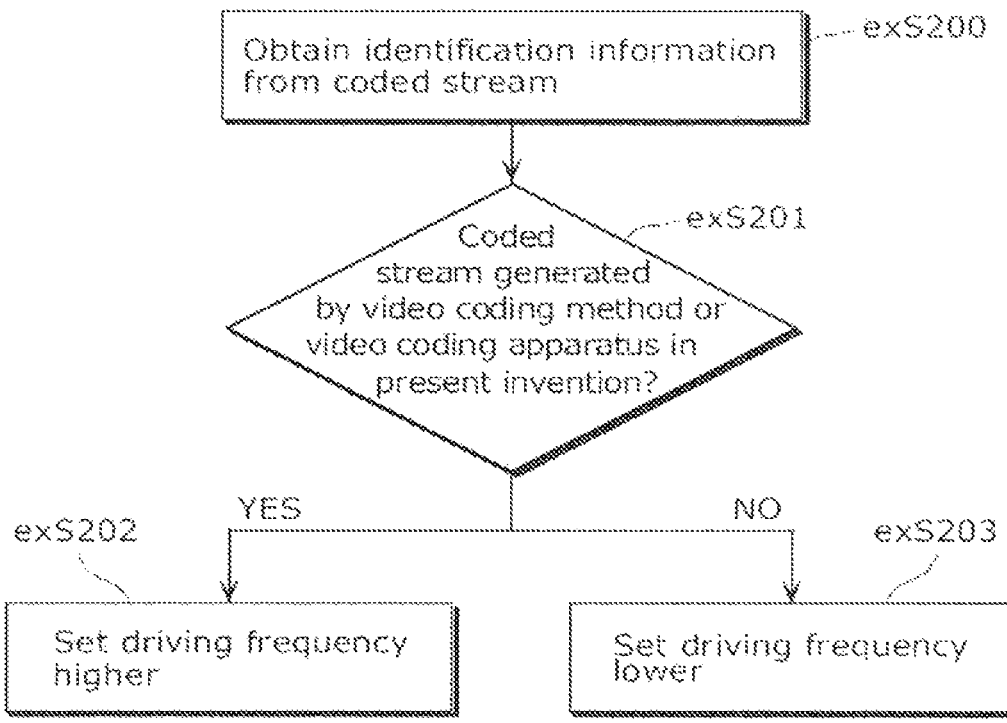

METHODS AND APPARATUSES FOR ENCODING AND DECODING VIDEO USING TEMPORAL MOTION VECTOR PREDICTION

TECHNICAL FIELD

The present invention relates to a method of encoding a video and a method of decoding a video using temporal motion vector prediction, and apparatuses thereof. The present invention can be applied in any multimedia data coding and, more particularly, in coding of image and video contents utilizing temporal motion vector prediction for inter-picture prediction.

BACKGROUND ART

Video coding schemes, such as H.264/MPEG-4 AVC and the upcoming HEVC (High-Efficiency Video Coding) perform encoding/decoding of image/video content using inter-picture (or simply "inter") prediction from previously encoded/decoded reference pictures to exploit information redundancy across consecutive pictures in time.

In a coded video bitstream, a reference picture used for the inter prediction process of a prediction unit (such as an M×N block of samples) is identified by or referred to using a reference index. A reference index is an index into an ordered list (known as a reference picture list) comprising one or more reference pictures. Each reference index is uniquely associated with a reference picture in the reference picture list. That is, the reference index is a value that is used to distinguish multiple reference pictures from each other.

The above-mentioned coding schemes support temporal prediction of motion vectors (i.e., motion vector prediction or MVP), whereby motion vectors of a target block of samples are predicted from the motion vectors of one or more previously coded blocks of samples in a collocated reference picture. Temporal motion vector prediction further reduces the bitrate associated with motion vectors by exploiting information redundancy among neighbouring motion vectors temporally. The collocated reference picture is selected among available reference pictures using a predetermined scheme, for example, selecting the first reference picture in a predetermined reference picture list (such as reference picture list 0) as the collocated reference picture.

In applications requiring video transmission across lossy environment, temporal motion vector prediction is susceptible to erroneous prediction of motion vector when the collocated reference picture is lost or contains errors. In the HEVC standard under development, a technique was disclosed for disabling temporal motion vector prediction of certain sub-picture unit (e.g., a slice). JCTVC-G398, "High-level Syntax: Marking process for non-TMVP pictures", Joint Collaborative Team on Video Coding (JCT-VC) of ITU-T SG 16 WP3 and ISO/IEC JTC1/SC29/WG11 7th meeting, Geneva, CH, November 2011. In this technique, it is necessary to introduce a marking flag in a Picture Parameter Set (PPS) used for marking a picture in the Decoder Picture Buffer (DPB) as "unused for temporal motion vector prediction". This marking process is performed by a decoder when a sub-picture unit refers to a PPS having a marking flag equal to "TRUE".

CITATION LIST

Non Patent Literature

[NPL 1]
ISO/IEC 14496-10, "MPEG-4 Part 10 Advanced Video Coding"
[NPL 2]
JCTVC-G398, "High-level Syntax: Marking process for non-TMVP pictures", Joint Collaborative Team on Video Coding (JCT-VC) of ITU-T SG 16 WP3 and ISO/IEC JTC1/SC29/WG11 7th meeting, Geneva, CH, November 2011

SUMMARY OF INVENTION

Technical Problem

As mentioned in the background, in a disclosed technique for disabling temporal motion vector prediction of certain slices, it is necessary to introduce a marking flag in a Picture Parameter Set (PPS) used for marking a picture in the Decoder Picture Buffer (DPB) as "unused for temporal motion vector prediction". A major problem associated with this technique is that when a slice which invokes the marking process is lost or contains error, the decoder cannot perform the intended marking process. As a result, subsequent synchronization between encoder and decoder is lost. Therefore, the above-mentioned technique for disabling temporal motion vector prediction is not robust.

Solution to Problem

The present invention seeks to provide methods and apparatuses for encoding and decoding video using temporal motion vector prediction with improved error robustness. In particular, the temporal motion vector prediction for a sub-picture unit (e.g., a slice) is enabled/disabled in a manner which is less susceptible to errors. For example, according to embodiments of the present invention, the above-mentioned marking process (i.e., for marking reference pictures as "unused for temporal motion vector prediction") to be performed by the decoder is eliminated.

According to a first aspect of the present invention, there is provided a method of encoding a video into a coded video bitstream with temporal motion vector prediction, the method comprising:
  determining a value of a flag for indicating whether temporal motion vector prediction is used or not used for the inter-picture prediction of a sub-picture unit of a picture;
  writing the flag having said value into a header of the sub-picture unit or a header of the picture; and
  wherein if the flag indicates that temporal motion vector prediction is used, the method further comprises:
creating a first list of motion vector predictors comprising a plurality of motion vector predictors including at least one temporal motion vector predictor derived from at least one motion vector from a collocated reference picture;
selecting a motion vector predictor out of the first list for a prediction unit in the sub-picture unit; and
writing a first parameter into the coded video bitstream for indicating the selected motion vector predictor out of the first list.
  Preferably, if the flag indicates that temporal motion vector prediction is not used, the method further comprises:
    creating a second list of motion vector predictors comprising a plurality of motion vector predictors without any temporal motion vector predictors;
selecting a motion vector predictor out of the second list for a prediction unit in the sub-picture unit; and writing a second parameter into the coded video bitstream for indicating the selected motion vector predictor out of the second list.

In an embodiment, the value of the flag is determined based on a temporal layer of the picture.

Preferably, if the temporal layer of the picture is determined to be the lowest or base layer, the value of the flag is set to indicate that temporal motion vector prediction is not used; otherwise, the value of the flag is set to indicate that temporal motion vector prediction is used.

In another embodiment, the value of the flag is determined based on a Picture Order Count (POC) value of the picture.

Preferably, if the POC value of the picture is determined greater than any POC values of reference pictures in a Decoder Picture Buffer (DPB), the value of the flag is set to indicate that temporal motion vector prediction is not used; otherwise, the value of the flag is set to indicate that temporal motion vector prediction is used.

In still another embodiment, the value of the flag is determined based on a sub-picture unit type of an inter-picture sub-picture unit in the picture.

Preferably, if the sub-picture unit type is a Predictive (P) type, the value of the flag is set to indicate that temporal motion vector prediction is not used; otherwise, the value of the flag is set to indicate that temporal motion vector prediction is used.

In yet another embodiment, the value of the flag is determined based on whether the picture containing the sub-picture unit is a Random Access Point (RAP) picture.

Preferably, if the picture is the RAP picture and the sub-picture unit belongs to a non-base layer of the picture, the value of the flag is set to indicate that temporal motion vector prediction is not used; otherwise, the value of the flag is set to indicate that temporal motion vector prediction is used.

Preferably, the flag is written to the header of the sub-picture unit.

Preferably, the method further comprises writing one or more parameters into the header of the sub-picture unit to specify the order of reference pictures in one or more reference picture lists used for inter prediction of the sub-picture unit.

Preferably, the method further comprises:
performing a motion compensated inter-picture prediction using the selected motion vector predictor to produce the prediction unit;
subtracting the prediction unit from a block of original samples to produce a block of residual samples; and
encoding the block of residual samples corresponding to the prediction unit into the coded video bitstream.

In an embodiment, the second list comprises one less motion vector predictor than the first list, and the motion vector predictors of the first and second lists are the same other than the temporal motion vector predictor.

Preferably, the first and second parameters are represented in the coded video bitstream using different predetermined bit representations.

In another embodiment, the first and second lists comprise the same predetermined number of motion vector predictors, and the second list comprises a motion vector predictor which is not present in the first list and is derived without using motion vectors from any reference pictures.

Preferably, the flag is used to indicate whether temporal motion vector prediction is used or not used for the inter-picture prediction of a sub-picture unit independently of other sub-picture units in the picture.

Preferably, the sub-picture unit is a slice of the picture.

According to a second aspect of the present invention, there is provided a method of decoding a coded video bitstream with temporal motion vector prediction, the method comprising:
parsing a flag from a header a sub-picture unit or a header of a picture of the coded video; and
determining whether the flag indicates that temporal motion vector prediction is used or not used;
wherein if the flag indicates that temporal motion vector prediction is used, the method further comprises:
creating a first list of motion vector predictors comprising a plurality of motion vector predictors including at least one temporal motion vector predictor derived from at least one motion vector from a collocated reference picture;
parsing a first parameter from the coded video bitstream which indicates a selected motion vector predictor out of the first list for a prediction unit in the sub-picture unit.

Preferably, if the flag indicates that temporal motion vector prediction is not used, the method further comprises:
creating a second list of motion vector predictors comprising a plurality of motion vector predictors without any temporal motion vector predictors; and
parsing a second parameter from the coded video bitstream which indicates a selected motion vector predictor out of the second list for a prediction unit in the sub-picture unit.

According to a third aspect of the present invention, there is provided an apparatus for encoding a video into a coded video bitstream with temporal motion vector prediction, the apparatus comprising:
a control unit operable to determine a value of a flag for indicating whether temporal motion vector prediction is used or not used for the inter-picture prediction of a sub-picture unit of a picture;
a writing unit operable to write the flag having said value into a header of the sub-picture unit or a header of the picture;
a motion vector prediction unit; and
an inter-picture prediction unit for performing inter-picture prediction based on a selected motion vector predictor from the motion vector prediction unit,
wherein the motion vector prediction unit is configured to receive the flag and based on the flag being a first value, the motion vector prediction unit is operable to create a first list of motion vector predictors comprising a plurality of motion vector predictors including at least one temporal motion vector predictor derived from at least one motion vector from a collocated reference picture, and select a motion vector predictor out of the first list for a prediction unit in the sub-picture unit; and
the writing unit is further operable to write a first parameter into the coded video bitstream for indicating the selected motion vector predictor out of the first list.

Preferably, when the flag is of a second value, the motion vector prediction unit is operable to create a second list of motion vector predictors comprising a plurality of motion vector predictors without any temporal motion vector predictors, and select a motion vector predictor out of the first list for a prediction unit in the sub-picture unit; and
the writing unit is further operable to write a second parameter into the coded video bitstream for indicating the selected motion vector predictor out of the second list.

According to a fourth aspect of the present invention, there is provided an apparatus for decoding a coded video bitstream with temporal motion vector prediction, the apparatus comprising:
a parsing unit operable to parse a flag from a header a sub-picture unit or a header of a picture of the coded video, and to determine whether the flag indicates that temporal motion vector prediction is used or not used;

a motion vector prediction unit; and an inter-picture prediction unit for performing inter-picture prediction based on a selected motion vector predictor from the motion vector prediction unit;

wherein the motion vector prediction unit is configured to receive the flag and based on the flag being a first value, the motion vector prediction unit is operable to create a first list of motion vector predictors comprising a plurality of motion vector predictors including at least one temporal motion vector predictor derived from at least one motion vector from a collocated reference picture; and the parsing unit is further operable to parse a first parameter from the coded video bitstream which indicates a selected motion vector predictor out of the first list for a prediction unit in the sub-picture unit.

Preferably, when the flag is of a second value, the motion vector prediction unit is operable to create a second list of motion vector predictors comprising a plurality of motion vector predictors without any temporal motion vector predictors; and the parsing unit is further operable to parse a second parameter from the coded video bitstream which indicates a selected motion vector predictor out of the second list for a prediction unit in the sub-picture unit.

Advantageous Effects of Invention

Embodiments of the present invention provide methods and apparatuses for encoding and decoding video using temporal motion vector prediction with improved error robustness of inter-picture prediction. For example, the embodiments can also result in improved flexibility and coding efficiency of inter-picture prediction as temporal motion vector prediction can be enabled and disabled independently for a plurality of sub-picture units within the same picture.

BRIEF DESCRIPTION OF DRAWINGS

FIG. 29 shows steps for identifying video data and switching between driving frequencies;

FIG. 30 shows an example of a look-up table in which video data standards are associated with driving frequencies;

DESCRIPTION OF EMBODIMENTS

According to exemplary embodiments of the present invention, there are provided a method of encoding video and a method of decoding video using temporal motion vector prediction (TMVP), and apparatuses thereof. In particular, the temporal motion vector prediction for a sub-picture unit (e.g., slice) is enabled/disabled in a manner which is less susceptible to errors. To achieve this, according to a preferred embodiment of the present invention, a flag is introduced into a header of a picture or more preferably a header of a sub-picture unit for indicating whether temporal motion vector prediction is used or not used for the inter-picture (or simply "inter") prediction of the sub-picture unit. This flag can also be referred to as a temporal motion vector prediction usage flag. In further aspects of the present invention, preferred techniques for determining/deciding the value of the flag are disclosed in various embodiments.

For clarity and simplicity, exemplary embodiments of the present invention will now be described in further details whereby the sub-picture unit is a slice of a picture. It will be appreciated by a person skilled in the art that slice partitioning is merely one possible method for dividing a picture into multiple sub-picture partitions. Therefore, embodiments of the present invention described hereinafter are not limited to the sub-picture unit being a slice. For example, other sub-picture partitioning methods such as tiles, entropy slices and wavefront partitioning units are all within the scope of the present invention.

Figure 1:
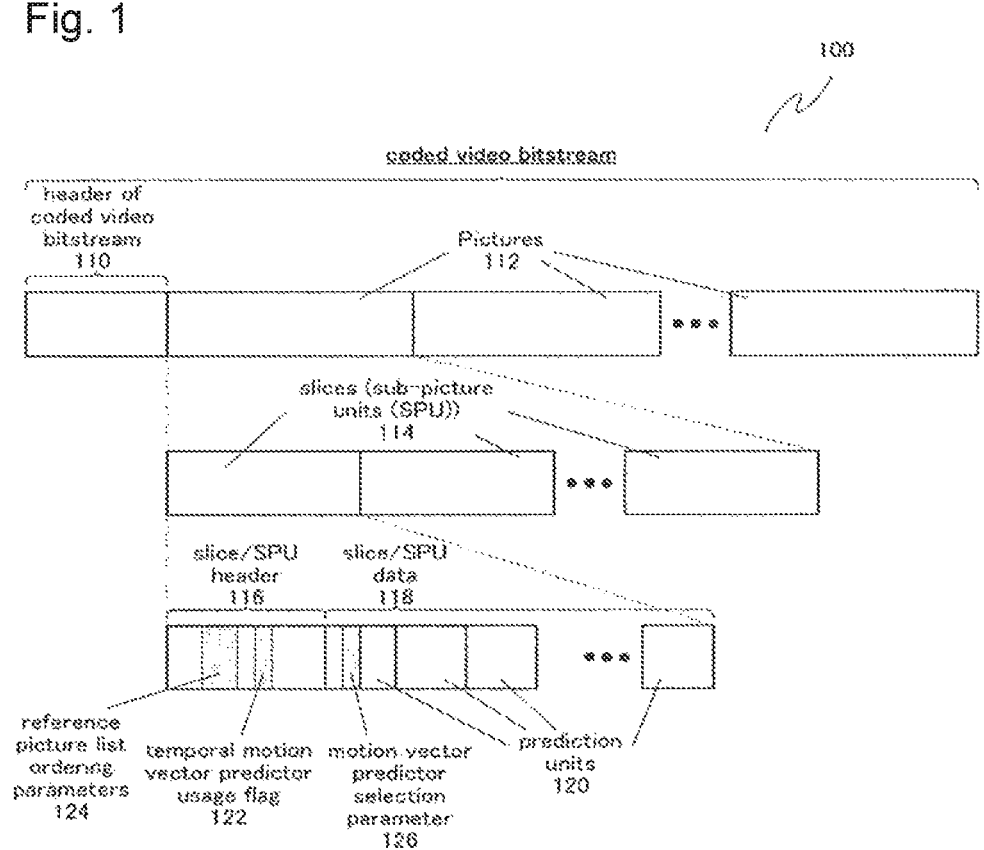
FIG. 1 depicts an exploded diagram representation of an exemplary coded video bitstream according to an embodiment of the present invention.

FIG. 1 is an exploded diagram representation of an exemplary coded video bitstream 100 according to an embodiment of the present invention. The coded video bitstream 100 comprises a header 110 and a plurality of pictures 112 associated with the header 110. The picture 112 is typically partitioned into a plurality of sub-picture units (e.g., slices) 114. Each slice 114 comprises a slice header 116 and a slice data 118 associated with the slice header 116. The slice data 118 comprises a plurality of prediction units 120 of inter prediction type.

In the exemplary embodiment as illustrated in FIG. 1, the flag 122 for indicating whether temporal motion vector prediction is used or not used for the inter prediction of the slice 114 is preferably located in the slice header 116. As a result, temporal motion vector prediction for each slice 114 can be enabled and disabled independently of other slices 114 in the same picture 112. The slice header 116 further comprises reference picture list ordering parameters 124 for specifying the order of reference pictures in one or more reference picture lists. These parameters 124 determine the effective or final order of the reference pictures in the reference picture lists used for inter prediction of the slice 114 associated with or corresponding to the slice header 116. These parameters 124 may specify a reordering process to be performed on one or more initial reference picture lists, or may specify that the initial reference picture lists are used without reordering. As shown in FIG. 1, the flag 122 is preferably located in the same slice header 116 as the reference picture list ordering parameters 124. A motion vector predictor selection parameter 126 is located at each prediction unit 120 for selecting a motion vector predictor out of the plurality of motion vector predictors available for inter prediction of the prediction unit 120.

In another embodiment, the reference picture list ordering parameters 124 and the temporal motion vector predictor usage flag 122 are located in a header (not shown) shared among a plurality of slices 114 within the same picture 112. For example, the picture level header 110 may be the Adaptation Parameter Set (APS) or the common slice segment header in the HEVC coding scheme.

As explained hereinbefore, slice partitioning is merely one possible method for dividing a picture into multiple sub-picture partitions. Other possible sub-picture partitioning methods may be used, for example tiles, entropy slices and wavefront partitioning units. In such other sub-picture partitioning methods, the parameters 124 and flag 122 located in the slice header 116 as described hereinbefore may instead be located in a header of a sub-picture unit.

Figure 2:
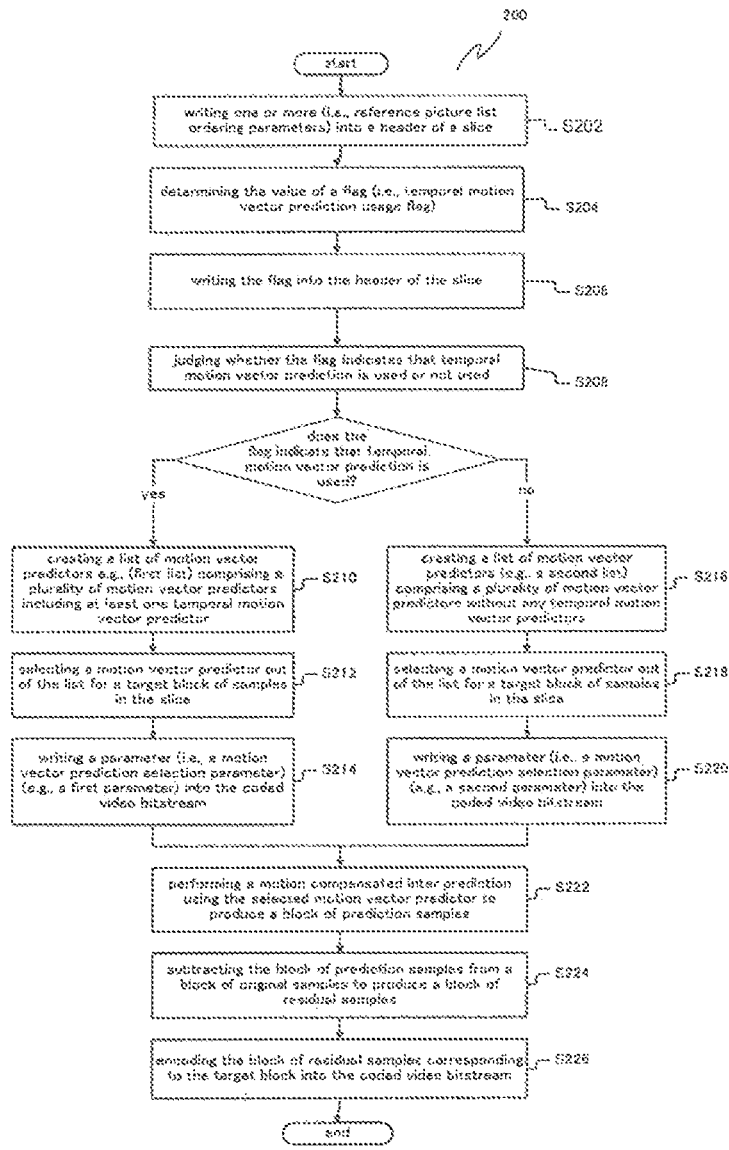
FIG. 2 depicts a flowchart illustrating a method of encoding a video according to an embodiment of the present invention.

FIG. 2 depicts a flowchart illustrating a method 200 of encoding a video according to an embodiment of the present invention. In Step S202, one or more parameters (i.e., reference picture list ordering parameters) 124 is written into a header 116 of a slice 114 for specifying the order of reference pictures in one or more reference picture lists used for inter prediction of the slice 124. A predetermined location (such as the first picture) in one of the reference picture lists (such as reference picture list 0) indicates the collocated reference picture. In Step S204, the value of a flag 122 which indicates whether temporal motion vector is used or not used for inter prediction of the slice 124 is determined. A number of techniques for determining the value of the flag 122 will be described later according to various embodiments of the present invention. Subsequently in Step 206, the flag 122 is written into the header 116 of the slice 114. In Step S208, the value of the flag 122 is analysed or judged to determine whether the flag 122 indicates that temporal motion vector prediction is used or not used. For example, a flag 122 having a value "0" may indicate that temporal motion vector prediction is not used and a flag 122 having a value "1" may indicate that temporal motion vector prediction is used, or vice versa.

If the flag 122 indicates that temporal motion vector prediction is used, in Step S210, a list of motion vector predictors (e.g., a first list) is created comprising a plurality of motion vector predictors including at least one temporal motion vector predictor derived from at least one motion vector from the collocated reference picture. By way of example only, the plurality of motion vectors may include at least one temporal motion vector predictor, one or more motion vectors derived from spatial neighbouring prediction units/blocks (i.e., spatial motion vector predictors) and a zero motion vector. In Step S212, a motion vector predictor is selected out of the list of motion vector predictors for a target block of samples (i.e., prediction unit) 120 in the slice 124. In Step 214, a parameter (i.e., a motion vector predictor selection parameter) (e.g., a first parameter) 126 is written into the coded video bitstream 100 (i.e., into the prediction unit 120 of the slice 114) for indicating the selected motion vector predictor out of the list of motion vector predictors.

On the other hand, if the flag 122 indicates that temporal motion vector prediction is not used, in Step S216, a list of motion vector predictors (e.g., a second list) is created comprising a plurality of motion vector predictors without any temporal motion vector predictors. In Step S218, a motion vector predictor is selected out of the list of motion vector predictors for a target block of samples (i.e., prediction unit) in the slice 124. In Step S220, a parameter (i.e., a motion vector predictor selection parameter) (e.g., a second parameter) is written into the coded video bitstream 100 (i.e., into each prediction unit 120 of the slice data 118 associated with the slice header 116) for indicating the selected motion vector predictor out of the list of motion vector predictors.

After Step S214 or Step S220, a motion compensated inter prediction is performed for the slice 214 using the selected motion vector predictor to produce a block of prediction samples. Subsequently, in Step S226, the block of prediction samples is subtracted from a block of original samples to produce a block of residual samples. Thereafter, in Step S226, the block of residual samples corresponding to the target block is encoded into the coded video bitstream 100.

Accordingly, in the above-described embodiment of the present invention, the flag 122 for indicating whether temporal motion vector prediction is used or not used is able to control one slice 114 independently of other slices 114 in the same picture 112. Therefore, the flag 122 corresponding to a first slice 114 does not determine whether temporal motion vector prediction is used or not used in a second or other slice in the same picture 112. Furthermore, in the above-described embodiment, the marking process on reference pictures in the Decoder Picture Buffer (DPB) as described in the background has been eliminated. This results in improved flexibility and coding efficiency of the inter prediction.

In an embodiment of the present invention, the first and second lists of motion vector predictors comprise different number of motion vector predictors. Preferably, the second list comprises one less motion vector predictor than the first list. In both the first and second lists, motion vector predictors other than the temporal motion vector predictor may be the same or equivalent. This can increase coding efficiency as the encoder has more choices to select the best candidate from a list which includes temporal motion vector predictor (i.e., the first list). The second list can provide better error resilience because temporal motion vector prediction is not used. In the coded video bitstream 100, the first and second parameters representing the selected motion vector predictor may use different bit representation, for example, using truncated unary representations having different maximum values in the arithmetic coding binarization or in the variable length code.

In another embodiment of the present invention, the first and second list comprise the same predetermined number of motion vector predictors. Instead of the temporal motion vector predictor, the second list comprises another unique predetermined motion vector predictor which is not present in the first list. This can increase coding efficiency as the encoder has more choices to select the best candidate from a list which includes a unique predetermined motion vector predictor (i.e., the second list). Since the maximum number of candidate temporal motion vector predictors is the same for both the first and second lists, this reduces the complexity in the parsing process of the index parameter used for indicating the selected motion vector predictor. The unique motion vector predictor is derived without temporal dependency, i.e., without using motion vectors from any reference pictures. By way of example only, the unique motion vector predictor may be a spatial motion vector predictor from a predetermined neighbouring location. As another example, the unique motion vector predictor may be a zero motion vector predictor.

An exemplary apparatus 300 for encoding a video according to an embodiment of the present invention will now be described below.

Figure 3:
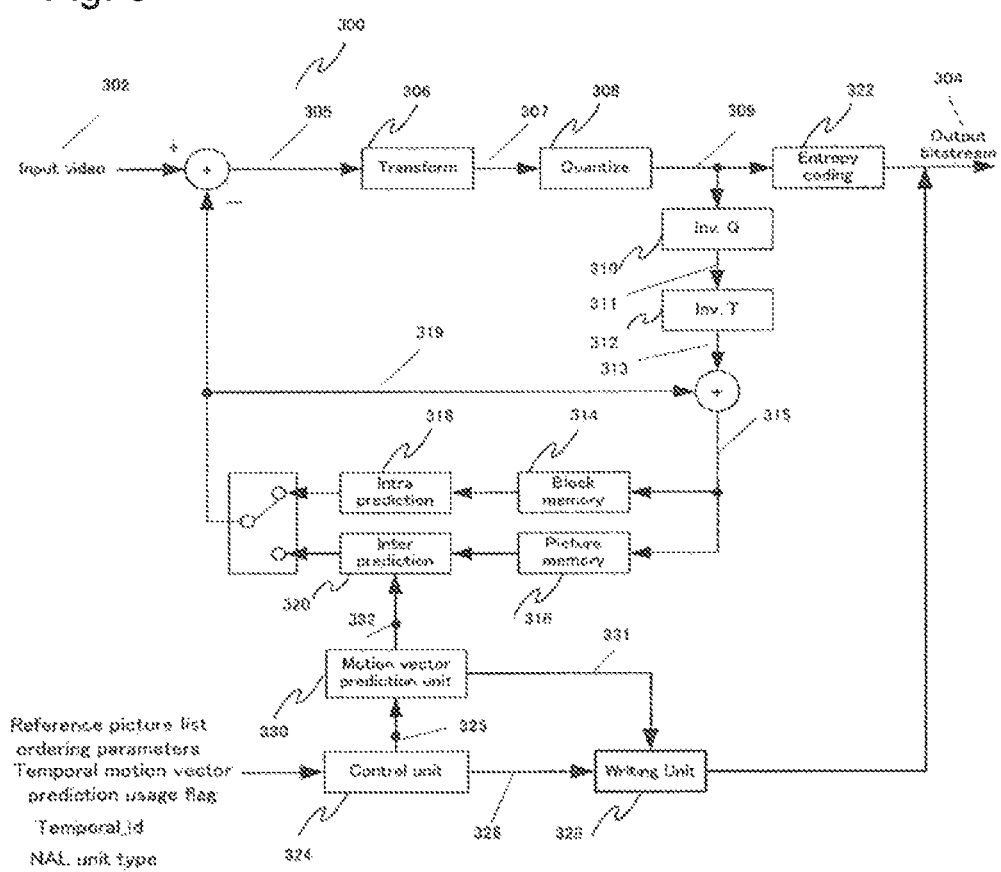
FIG. 3 depicts a schematic block diagram of an exemplary apparatus for encoding an input video/image bitstream.

FIG. 3 depicts a schematic block diagram of the exemplary apparatus 300 for encoding an input video/image bitstream 302 on a block-by-block basis so as to generate an encoded video bitstream 304. The apparatus 300 comprises a transformation unit 306 operable to transform an input data into frequency coefficients, a quantization unit 308 operable to perform quantization on an input data, an inverse quantization unit 310 operable to perform an inverse quantization on an input data, an inverse transformation unit 312 operable to perform inverse frequency transform on an input data, a block memory 314 and a picture memory 316 operable to store data such as videos and images, an intra prediction unit 318 operable to perform intra prediction, an inter prediction unit 320 operable to perform inter prediction, an entropy coding unit 322 operable to encode an input data into a coded video bitstream 304, a control unit 324 operable to decide whether temporal motion vector prediction is used or not used for the inter prediction of a target slice, a motion vector prediction unit 330, and a writing unit 328 operable to write data into the coded video bitstream 304.

For clarity, an exemplary data flow through the apparatus 300 as shown in FIG. 3 will now be described. An input video 302 is inputted to an adder, and the added value 305 is outputted to the transformation unit 306. The transformation unit 306 transforms the added values 305 into frequency coefficients, and outputs the resulting frequency coefficients 307 to the quantization unit 308. The quantization unit 308 quantizes the inputted frequency coefficients 307, and outputs the resulting quantized values 309 to the inverse quantization unit 310 and the entropy coding unit 322. The entropy coding unit 322 encodes the quantized values 309 output from the quantization unit 308, and outputs a coded video bitstream 304.

The inverse quantization unit 310 inversely quantizes the quantized values 309 output from the quantization unit 308, and outputs the frequency coefficients 311 to the inverse transformation unit 312. The inverse transformation unit 312 performs inverse frequency transform on the frequency coefficients 311 so as to transform the frequency coefficients into sample values of the bitstream, and outputs the resulting sample values 313 to an adder. The adder adds the sample values 313 of the bitstream output from the inverse transformation unit 314 to the predicted video/image values 319 output from the intra or inter prediction unit 318 or 320, and outputs the resulting added values 315 to the block memory 105 or the picture memory 106 for further prediction. The intra or inter prediction unit 318 or 320 searches within reconstructed videos/images stored in the block memory 314 or the picture memory 316, and estimates a video/image area which is e.g. most similar to the input videos/images for prediction.

The control unit 324 makes a decision on whether temporal motion vector prediction is used or not used for the inter prediction of a target slice and outputs a signal 325 indicating the decision to the motion vector prediction unit 330 and to the writing unit 322. A number of techniques for deciding/determining whether temporal motion vector prediction is used or not used (i.e., determining the value of the flag 122) will be described later according to various embodiments of the present invention. Based on this decision, the inter prediction unit 320 performs inter prediction with or without using temporal motion vector predictor. In particular, the motion vector prediction unit 330 is configured to receive the flag 122 and if the flag of of a first value (e.g., "1"), the motion vector prediction unit 330 is operable to create the first list of motion vector predictors comprising a plurality of motion vector predictors including at least one temporal motion vector predictor derived from at least one motion vector from a collocated reference picture, and select a motion vector predictor out of the first list for a prediction unit in the sub-picture unit. The writing unit 328 is further operable to write the first parameter into the coded video bitstream for indicating the selected motion vector predictor 331 out of the first list. On the other hand, if the flag 122 is of a second value (e.g., "0"), the motion vector prediction unit 330 is operable to create the second list of motion vector predictors comprising a plurality of motion vector predictors without any temporal motion vector predictors, and select a motion vector predictor out of the second list for a prediction unit in the sub-picture unit. In this case, the writing unit 328 is further operable to write the second parameter into the coded video bitstream 304 for indicating the selected motion vector predictor 331 out of the second list. The writing unit 328 is also operable to write the data 326 representative of the flag 122 having either a first or second value (e.g., "0" or "1") indicating whether temporal motion vector prediction is used or not used into the coded video bitstream 304 (e.g., a header of the sub-picture unit or a header of the picture).

Figure 4:
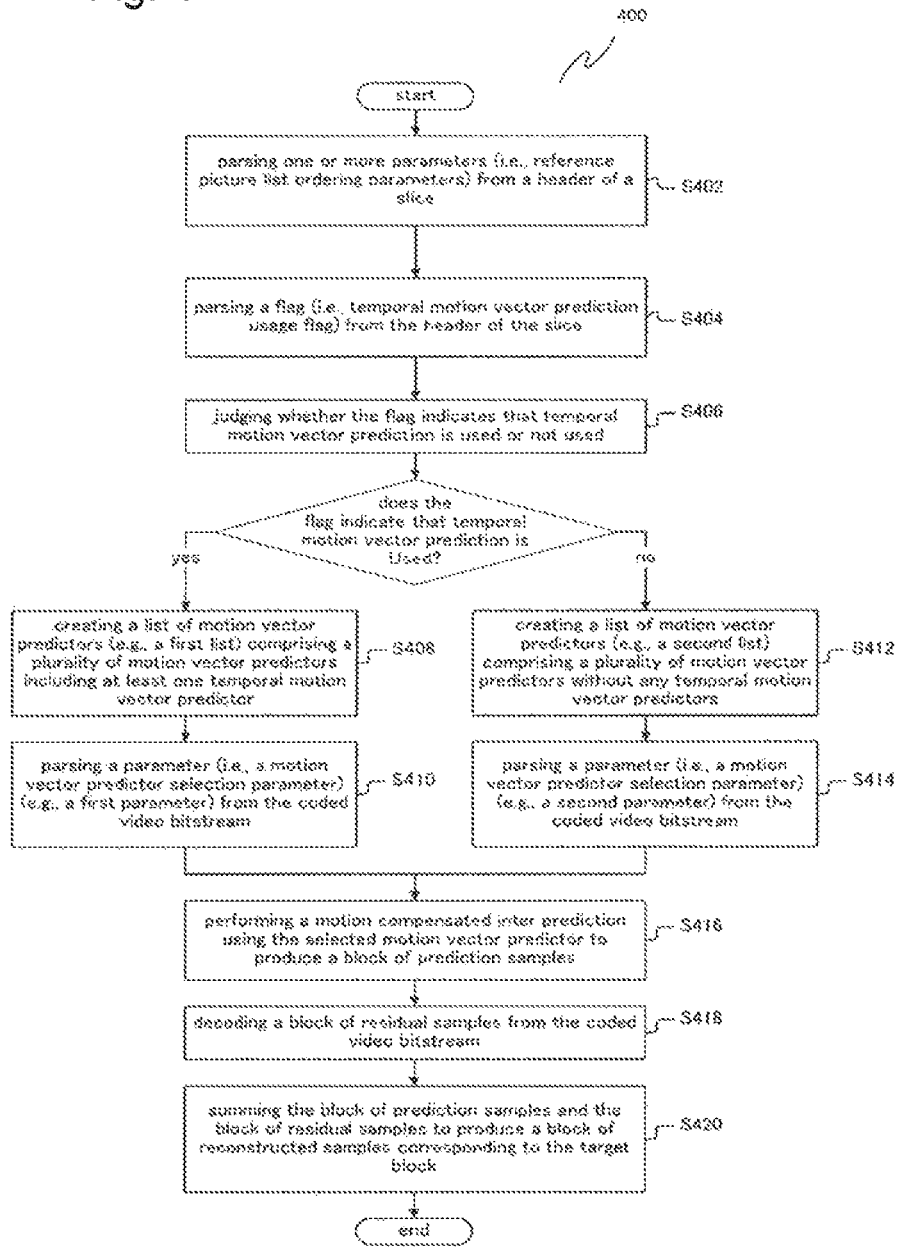
FIG. 4 depicts a flowchart illustrating a method of decoding an encoded video according to an embodiment of the present invention.

FIG. 4 depicts a flowchart illustrating a method 400 of decoding an encoded video according to an embodiment of the present invention. In particular, the method 400 is operable to decode a coded video bitstream 100 encoded according to the above-described method of encoding a video as shown in FIG. 2. In Step S402, one or more parameters (i.e., reference picture list ordering parameters) are parsed from a header 116 of a slice 114 to specify the order of reference pictures in one or more reference picture lists used for the inter prediction of the slice 114. As mentioned hereinbefore, a predetermined location (such as the first picture) in one of the reference picture lists (such as reference picture list 0) indicates the collocated reference picture. In Step S404, a flag (i.e., temporal motion vector prediction flag) 122 is parsed from the header 116 which indicates whether temporal motion vector prediction is used or not used for inter prediction of the slice 118. In Step S406, the value of the flag 122 is analysed or judged to determine whether the flag 122 indicates that temporal motion vector prediction is used or not used.

If the flag 122 indicates that temporal motion vector prediction is used, in Step S408, a list of motion vector predictors (e.g., a first list) is created comprising a plurality of motion vector predictors including at least one temporal motion vector predictor derived from at least one motion vector from the collocated reference picture. By way of example only, the plurality of motion vectors may include at least one temporal motion vector predictor, one or more motion vectors derived from spatial neighbouring prediction units/blocks (i.e., spatial motion vector predictors) and a zero motion vector. In Step S410, a parameter (i.e., a motion vector predictor selection parameter) (e.g., a first parameter) 126 is parsed from the coded video bitstream 100 (i.e., from a prediction unit 120 of the slice 114) which indicates a selected motion vector predictor out of the list of motion vector predictors for a target block of samples (i.e., a prediction unit 120) in the slice 114.

On the other hand, if the flag 122 indicates that temporal motion vector prediction is not used, in Step S412, a list of motion vector predictors (e.g., a second list) is created comprising a plurality of motion vector predictors without any temporal motion vector predictors. In Step S414, a parameter (i.e., a motion vector predictor selection parameter) (e.g., a second parameter) is parsed from the coded video bitstream 100 (i.e., from a prediction unit 120 of the slice 114) which indicates a selected motion vector predictor out of the list of motion vector predictors for a target block of samples (i.e., a prediction unit 120) in the slice 114.

After Step S410 or Step S414, a motion compensated inter prediction is performed using the selected motion vector predictor to produce a block of prediction samples in Step S416. Subsequently, in Step S418, a block of residual samples is decoded from the coded video bitstream 100. Thereafter, in Step S420, the block of prediction samples and the block of residual samples is added together to produce a block of reconstructed samples corresponding to the target block.

An exemplary apparatus 500 for decoding an encoded video according to an embodiment of the present invention will now be described below.

Figure 5:
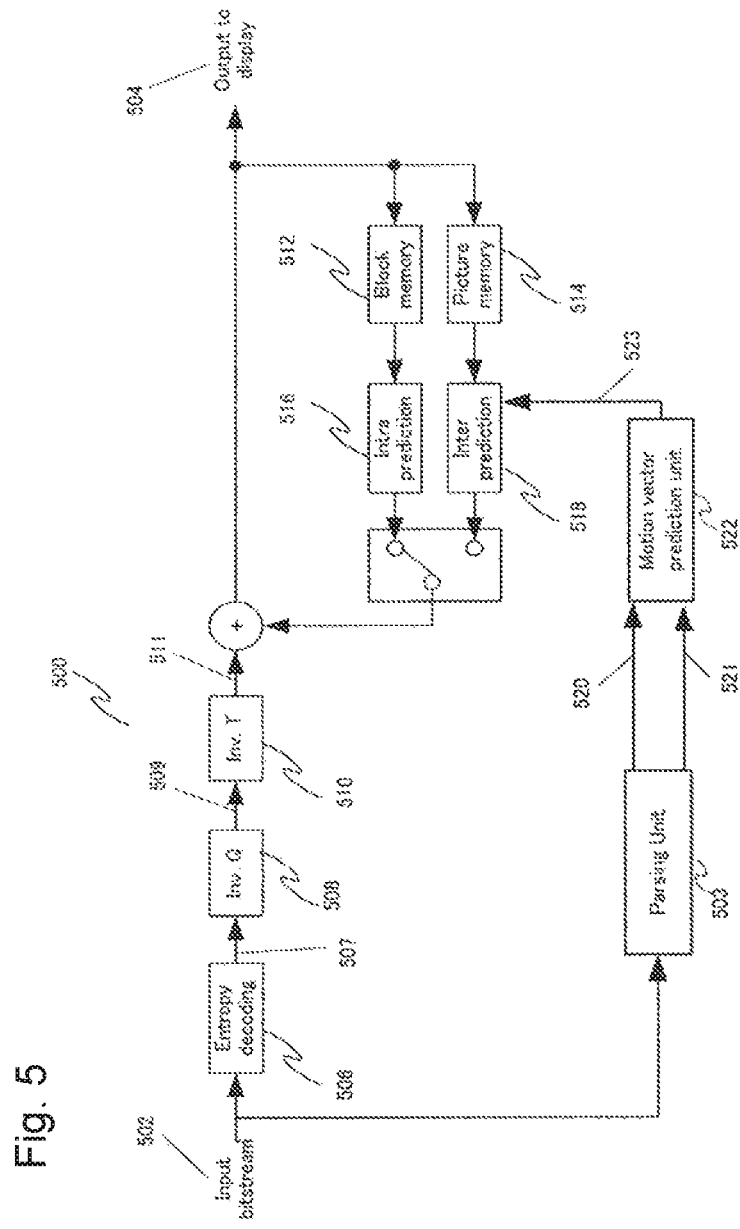
FIG. 5 depicts a schematic block diagram of an exemplary apparatus for decoding an input coded bitstream.

FIG. 5 depicts a schematic block diagram of the exemplary apparatus 500 for decoding an input coded bitstream 502 on a block-by-block basis and outputting videos/images 504 e.g., to a display. The apparatus 500 comprises an entropy decoding unit 506 operable to decode an input encoded bitstream 502, an inverse quantization unit 508 operable to perform an inverse quantization on an input data, an inverse transformation unit 510 operable to perform inverse frequency transformation on an input data, a block memory 512 and a picture memory 514 operable to store data such as videos and images, an intra prediction unit 516 for performing intra prediction, an inter prediction unit 518 for performing inter prediction, a motion vector prediction unit 522, and a parsing unit 503 operable to parse the input coded bitstream 502 and output various parameters 520, 521.

For clarity, an exemplary data flow through the apparatus 500 as shown in FIG. 5 will now be described. An input encoded bitstream 502 is inputted to the entropy decoding unit 506. After the encoded bitstream 502 is inputted to the entropy decoding unit 506, the entropy decoding unit 506 decodes the input encoded bitstream 502, and outputs the decoded values 507 to the inverse quantization unit 508. The inverse quantization unit 508 inversely quantizes the decoded values 507, and outputs the frequency coefficients 509 to the inverse transformation unit 510. The inverse transformation unit 510 performs inverse frequency transform on the frequency coefficients 509 to transform the frequency coefficients 509 into sample values 511, and outputs the resulting sample values 511 to an adder. The adder adds the resulting sample values 511 to the predicted video/image values 519 output from the intra or inter prediction unit 516 or 518, and outputs the resulting values 504 to, e.g., a display, and to the block memory 512 or the picture memory 514 for further prediction. In addition, the intra or inter prediction unit 516 or 518 searches within videos/images stored in the block memory 512 or picture memory 514, and estimates a video/image area which is e.g. most similar to the decoded videos/images for prediction.

Furthermore, the parsing unit 506 parses a flag 122 from a header of the slice or the picture indicating whether temporal motion vector prediction is used or not used for inter prediction of a target slice, and outputs the parsed data 520 to the motion vector prediction unit 522. The inter prediction unit 518 is operable to perform inter prediction with or without using temporal motion vector predictor based on the value of the flag 122 and the selected motion vector predictor from the motion vector prediction unit 522. In particular, the motion vector prediction unit 522 is configured to receive the data 520 containing the flag 122 and if the flag is of a first value (e.g., "1"), the motion vector prediction unit 522 is operable to create the first list of motion vector predictors comprising a plurality of motion vector predictors including at least one temporal motion vector predictor derived from at least one motion vector from a collocated reference picture. If the flag is of a second value (e.g., "0"), the motion vector unit 522 is operable to create a second list of motion vector predictors comprising a plurality of motion vector predictors without any temporal motion vector predictors. The parsing unit 503 is further operable to parse the first or second parameter from the coded video bitstream 502 which indicates a selected motion vector predictor out of the second list for a prediction unit in the sub-picture unit, and output the parsed data 521 to the motion vector prediction unit 522.

As mentioned hereinbefore, a number of techniques for deciding/determining whether temporal motion vector prediction is used or not used (i.e., determining the value of the flag 122) will now be described according to various embodiments of the present invention.

Figure 6:
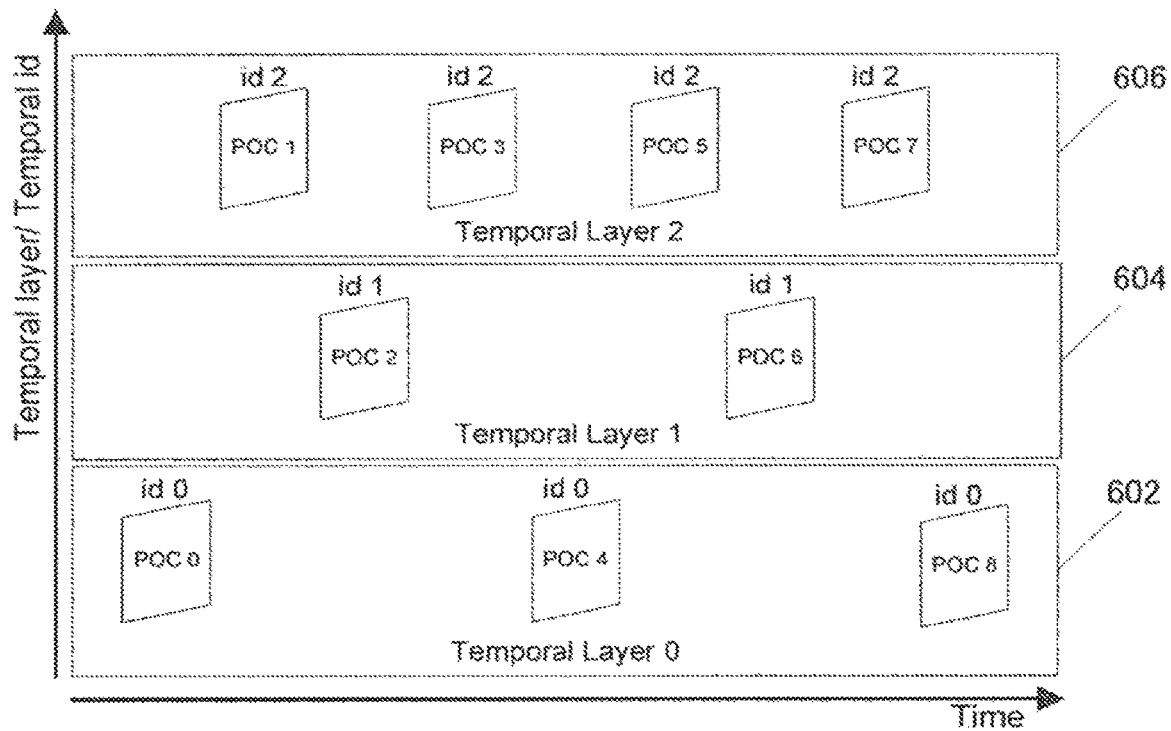
FIG. 6 depicts a diagram showing the different temporal layers for an exemplary group of pictures.

According to a first embodiment, the value of the flag 122 is determined based on a temporal layer of the current picture. FIG. 6 depicts a diagram showing the different temporal layers for a group of pictures when the group size/structure is configured to 4 for example. In the example, there are three temporal layers, namely, temporal layer "0" 602, temporal layer "1" 604 and temporal layer "2" 606. Pictures with Picture Order Count (POC) values of 0, 4 and 8 are located in temporal layer "0" 602, pictures with POC values of 2 and 6 are located in temporal layer "1" 604, and pictures with POC values of 1, 3, 5 and 7 are located in temporal layer "2" 606. Temporal layers "0", "1" and "2" are respectively associated with or represented by temporal ID 0, 1 and 2. Accordingly, pictures in temporal layer "0" 602 have associated therewith temporal ID "0", pictures in temporal layer "1" 604 have associated therewith temporal ID 1, and pictures in temporal layer "2" 606 have associated therewith temporal ID 2.

Figure 7:
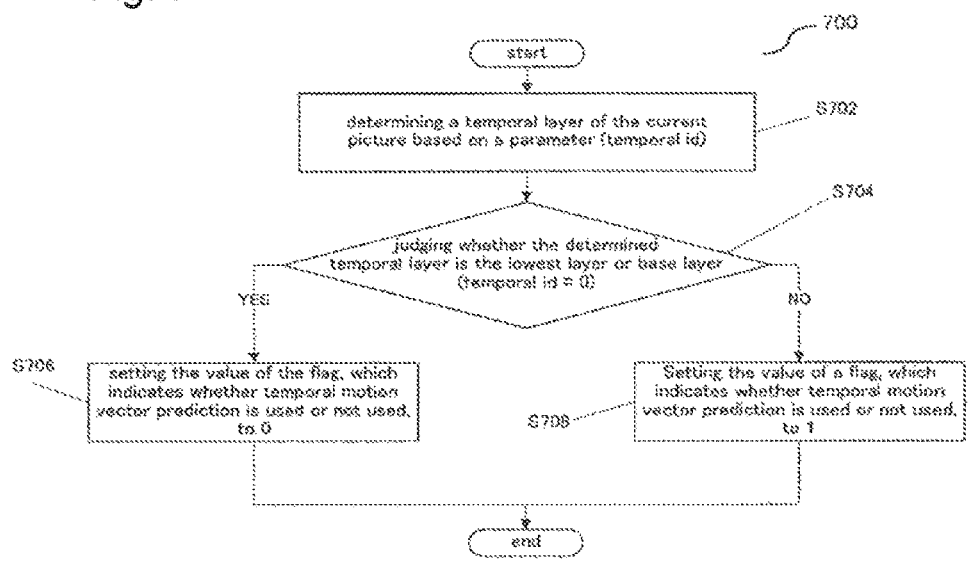
FIG. 7 depicts a flowchart illustrating a method of determining the value of the temporal motion vector prediction usage flag according to a first embodiment.

FIG. 7 depicts a flowchart illustrating a method 700 of determining the value of the flag 122 according to the first embodiment. In Step S702, the temporal layer of the current picture is determined based on the temporal ID associated with the current picture. Subsequently, in Step S704, the determined temporal layer is analysed or judged whether it is the lowest layer or base layer (i.e., whether temporal ID=0). If the temporal layer is the lowest layer, in Step S706, the flag 122 is set to a value (e.g., "0") indicating that temporal motion vector prediction is not used. On the other hand, if the temporal layer is not the lowest layer, in Step S708, the flag 122 is set to a value (e.g., "1") indicating that temporal motion vector prediction is used. This is because in a typical coding structure, pictures with temporal ID=0 are often referenced by higher temporal ID pictures. In a case when the picture with temporal ID=0 is lost or contains error, the error will propagate to any pictures which reference to that picture with temporal ID=0. This error propagation may continue and effect the reconstruction of all subsequence pictures which use temporal motion vector picture with temporal ID=0. Therefore, this embodiment improves the error resilience by not using temporal motion vector picture with temporal ID=0.

Figure 8:
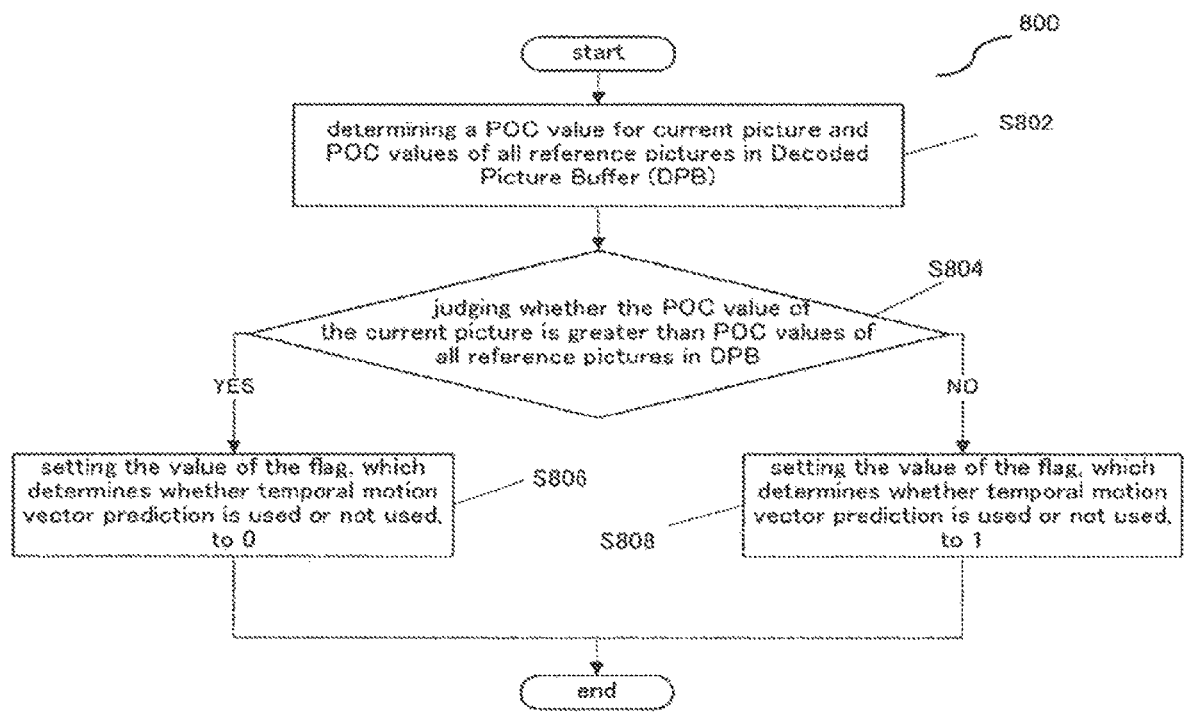
FIG. 8 depicts a flowchart illustrating a method of determining the value of the temporal motion vector prediction usage flag according to a second embodiment.

According to a second embodiment, the value of the flag 122 is determined based on the POC value of the current picture. FIG. 8 depicts a flowchart illustrating a method 800 of determining the value of the flag 122 according to the second embodiment. In Step S802, a POC value for the current picture and POC values of all reference pictures in the DPB are obtained or determined. In Step S804, the POC value of the current picture is analysed or judged whether it is greater than any of the POC values of the reference picture in the DPB. If so, in Step S806, the flag 122 is set to a value (e.g., "0") indicating that temporal motion vector prediction is not used. Otherwise, in Step S808, the flag 122 is set to a value (e.g., "1") indicating that temporal motion vector prediction is used. This is because a higher quality picture (e.g., temporal layer 0 pictures) only reference to either the same or higher quality pictures. In this embodiment, a higher quality picture is identified in view of POC values of reference pictures contain in the decoded picture buffer which stores a plurality of reference pictures. For a reason similar to the above-described first embodiment, higher quality pictures are often referenced by subsequent pictures. Accordingly, to prevent or minimise the error propagation and to improve error resilience, the flag 122 is disabled for higher quality pictures.

Figure 9:
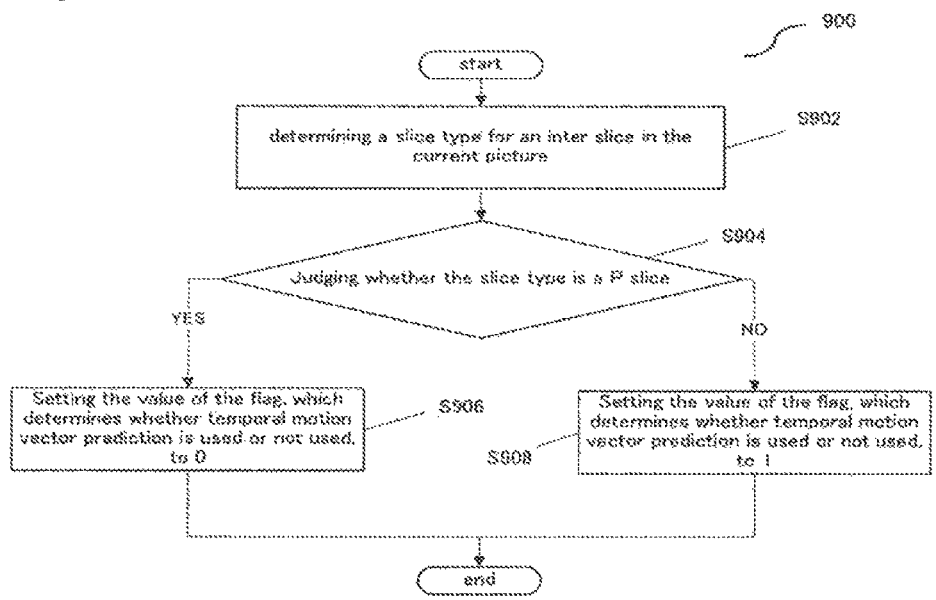
FIG. 9 depicts a flowchart illustrating a method of determining the value of the temporal motion vector prediction usage flag according to a third embodiment.

According to a third embodiment, the value of the flag 122 is determined based on the slice type of an inter slice in the current picture. An inter slice is a slice that is encoded or decoded using inter prediction. FIG. 9 depicts a flowchart illustrating a method 900 of determining the value of the flag 122 according to the third embodiment. In Step 902, a slice type of an inter slice in the current picture is determined. Subsequently, the slice type is analysed or judged whether it is a P slice (i.e., a predictive slice). If so, in Step S906, the flag 122 is set to a value (e.g., "0") indicating that temporal motion vector prediction is not used. On the other hand, if the determined slice type if not a P slice (e.g., it is a bi-predictive or B slice), in Step S908, the flag 122 is set to a value (e.g., "1") indicating that temporal motion vector prediction is used. A reason for this is because P-slice uses uni-direction forward prediction. Therefore, to prevent or minimise error propagation and to improve error resilience, the flag 122 is disabled for P slice.

Figure 10:
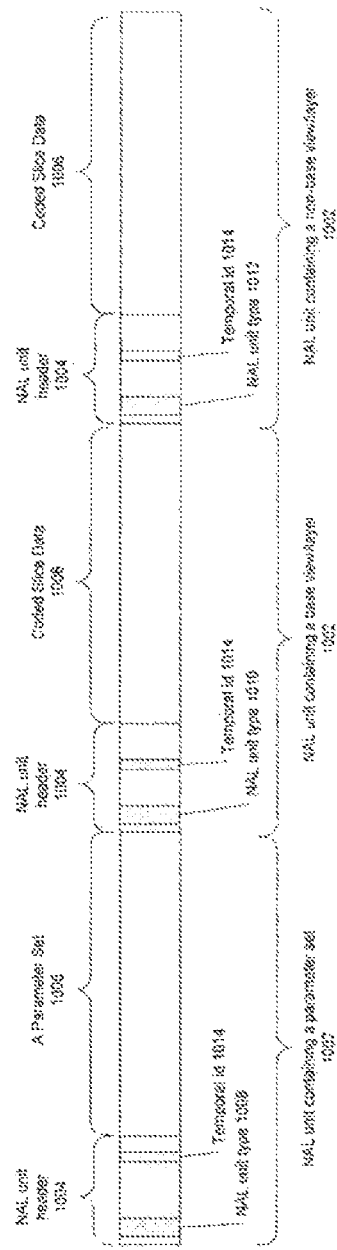
FIG. 10 depicts a diagram representation of a NAL unit stream, i.e., a series of NAL units for a coded video bitstream.

According to a fourth embodiment, the value of the flag 122 is determined based on whether the picture is a Random Access Point (RAP) picture. A RAP picture is a picture which itself and all subsequent pictures in decoding order can be correctly decoded without having to perform the decoding process of any pictures that precede the RAP picture in decoding order. For example, HEVC specification specifies a RAP picture as a coded picture for which each slice segment has NAL unit type (i.e., nal_unit_type) in the range of 7 to 12, inclusively. FIG. 10 depicts a diagram representation of a NAL unit stream, i.e., a series of NAL units 102 for a coded video bitstream. As known to a person skilled in the art, the NAL (Network Abstraction Layer) formats the Video Coding Layer (VCL) representation of a coded video and provides header information in a manner appropriate for conveyance by a variety of transport layers or storage media. Each NAL unit 102 comprises a header 104 followed by a data section 106. The header 104 includes a parameter indicating the type of data in the NAL unit 102 and the data section 106 contains the data indicated by the header 104. For example, FIG. 10 shows three NAL units, a first NAL unit containing a parameter set (as indicated by the NAL unit type 108), a second NAL unit containing a base view/layer (as indicated by the NAL unit type 110), and a third NAL unit containing a non-base view/layer (as indicated by the NAL unit type 112). The header 104 of each NAL unit further comprises a temporal ID as described in the first embodiment shown in FIG. 7.

Figure 11:
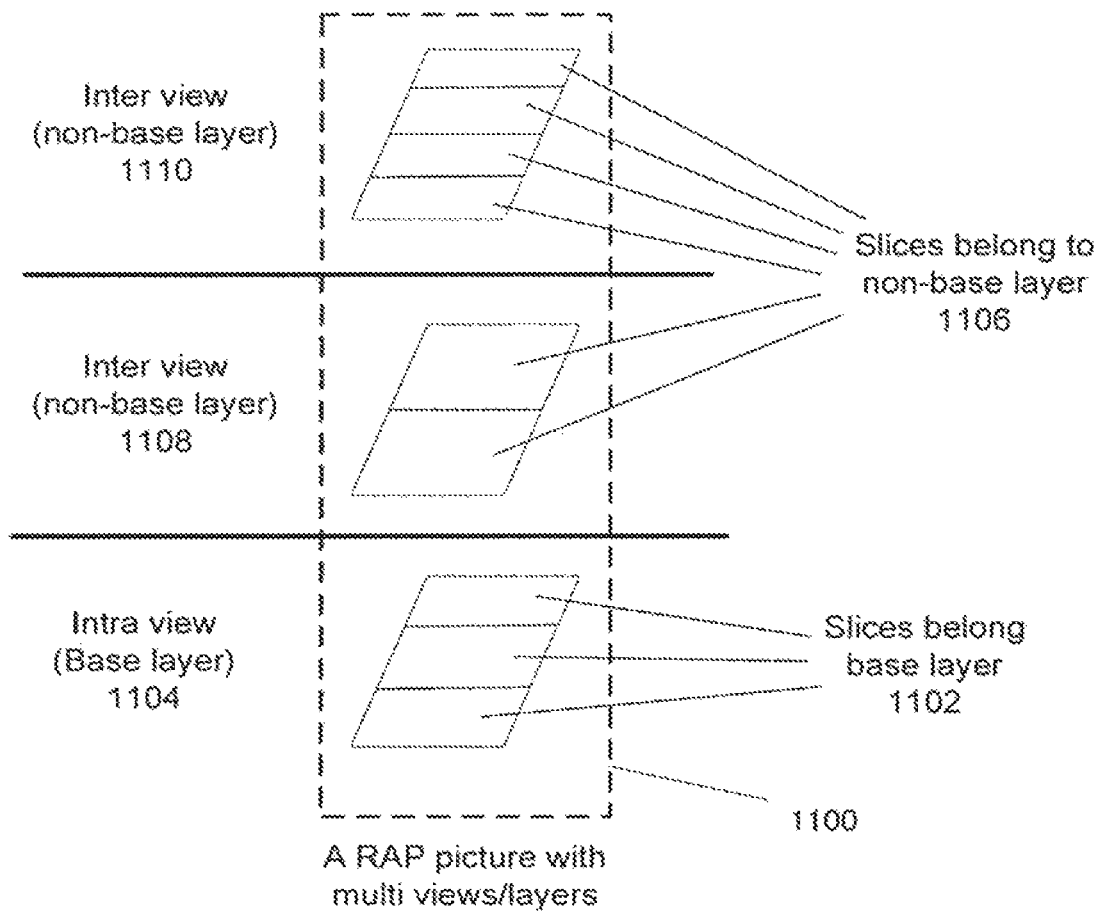
FIG. 11 depicts a diagram representation of an exemplary RAP picture containing multiple views/layers with multiple slices.

FIG. 11 depicts a diagram representation of an exemplary RAP picture 1100 containing multiple views/layers with multiple slices. As shown, the RAP picture 1100 comprise multiple slices 1102 in the base layer (intra view) 1104 and multiple slices 1106 in the non-base layer (inter view) 1110.

Figure 12:
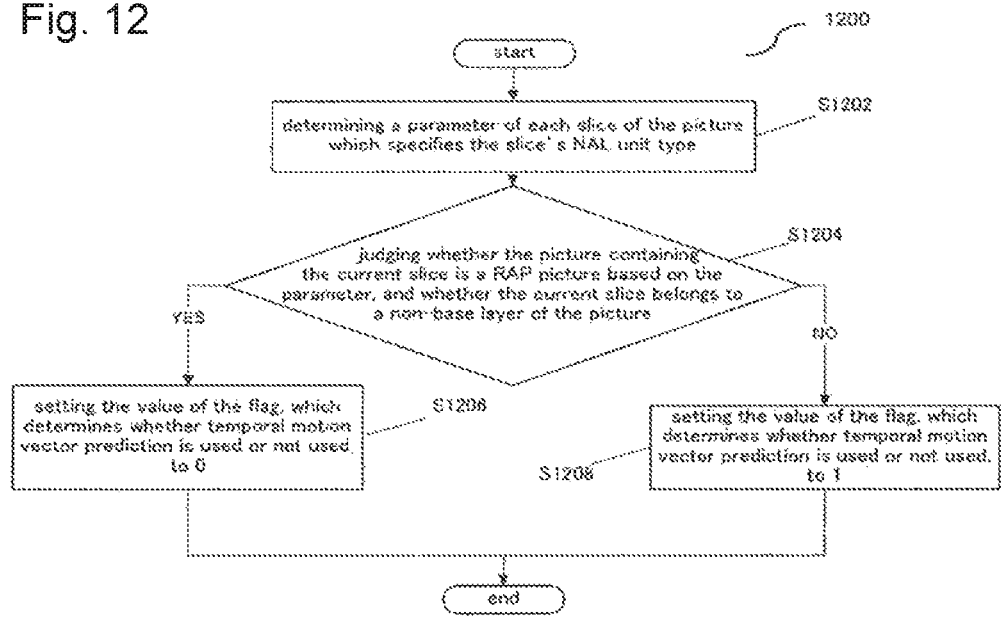
FIG. 12 depicts a flowchart illustrating a method of determining the value of the temporal motion vector prediction usage flag according to a fourth embodiment.

FIG. 12 depicts a flowchart illustrating a method 1200 of determining the value of the flag 122 according to the fourth embodiment. In Step S1202, the picture is analysed to determine or obtain a parameter of each slice of the picture which specifies the slices' NAL unit type. Subsequently, in Step S1204, it is determined or judged whether the picture containing the current slice is a RAP picture based on the parameter(s) obtained and whether the current slice belongs to a non-base layer/view of the picture. Whether the picture is a RAP picture 1100 can be determined by analysing the value of the NAL unit type 1008, 1010, 1012 in the header 1004 of each NAL unit or slice 1002 in the picture. As mentioned above, a RAP picture 1100 is a picture which itself and all subsequent pictures in decoding order can be correctly decoded without performing the decoding process of any pictures the precede the RAP picture 1100 in decoding order. For example, HEVC specification specifies a RAP picture as a coded picture for which each slice segment has NAL unit type in the range of 7 to 12, inclusively. Accordingly, in this example, if the NAL unit type 1008, 1010, 1012 of each NAL unit 1002 in the picture is in the range of 7 to 12, inclusively, then the picture is determined to be a RAP picture 1100. Whether the current slice is a non-base layer of the picture can be determined by examining the NAL unit type 1008, 1010, 1012 of the current slice. For example, the NAL unit type 1012 indicates that the associated slice 1006 belongs to a non-base layer and the NAL unit type 1010 indicates that the associated slice 1006 belongs to a base layer. However, it will be appreciated to a person skilled in the art that the non-base layer can be identified based on other parameter(s) depending on the video coding scheme. For example, in the current HEVC multi-view HEVC working draft, whether the current slice is a non-base layer of the picture is determined by the layer ID. If the picture is a RAP picture 1100 and the current slice belongs to a non-base layer of the picture, in Step S1206, the flag 122 is set to a value (e.g., "0") indicating that temporal motion vector prediction is not used. Otherwise, in Step S1208, the flag 122 is set to a value (e.g., "1") indicating that temporal motion vector prediction is used. A reason for this is because the benefit of using temporal motion vector prediction is to improve the motion vector prediction temporally, that is, prediction from other pictures which are different in time. However, if the intra and inter pictures lie within the same time in the current picture, there is no benefit of using temporal motion vector prediction. Therefore, to improve coding/decoding efficiency, the flag 122 is disabled for slices 1106 belonging to non-base (or inter view) layer of a RAP picture 1100.

Embodiment A

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 13:
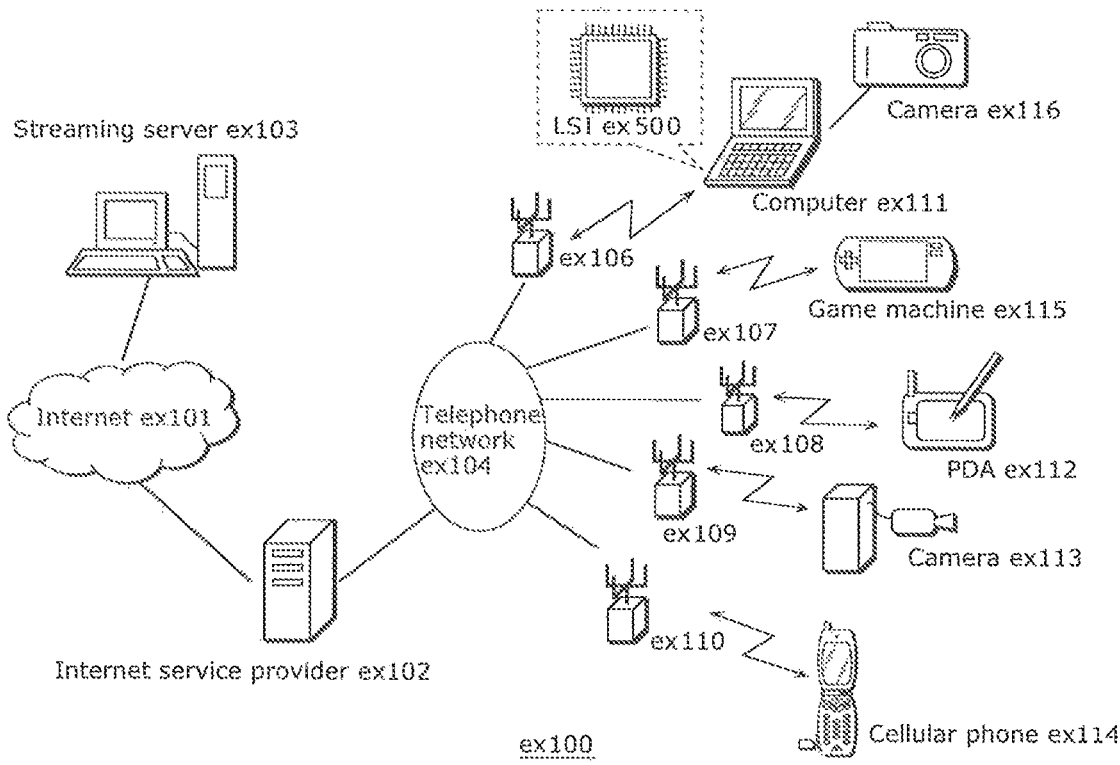
FIG. 13 shows an overall configuration of a content providing system for implementing content distribution services.

FIG. 13 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 13, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data. As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 14:
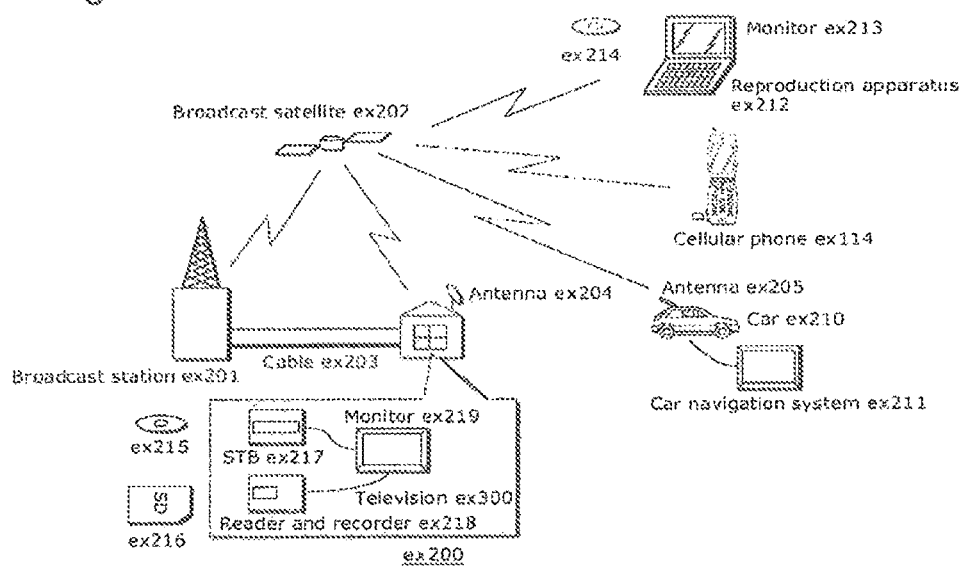
FIG. 14 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 14. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 15:
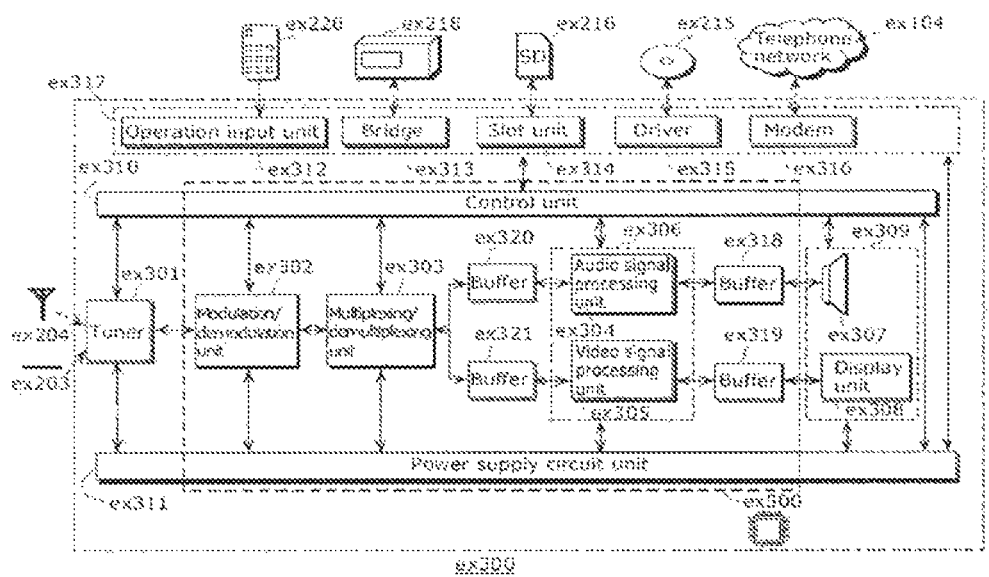
FIG. 15 shows a block diagram illustrating an example of a configuration of a television.

FIG. 15 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 16:
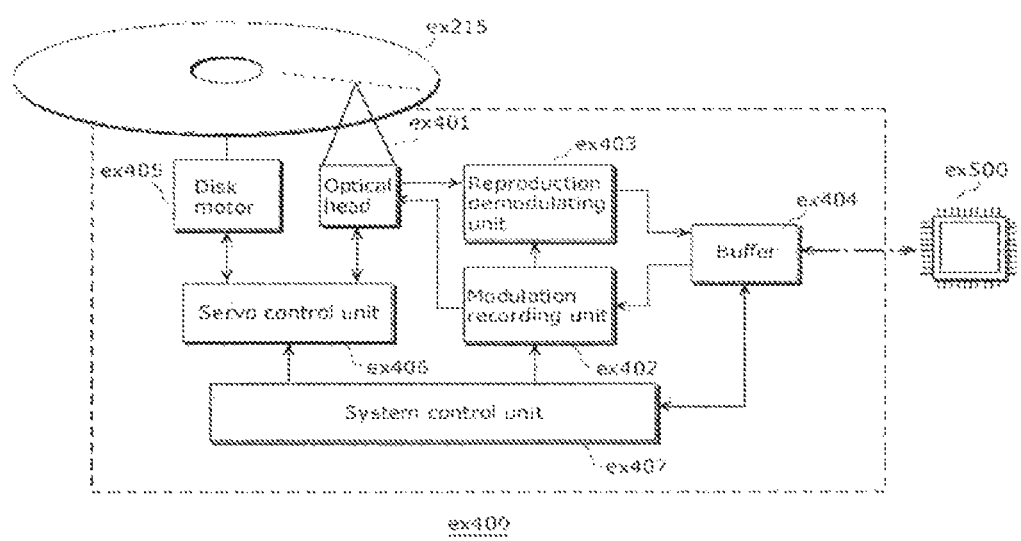
FIG. 16 shows a block diagram illustrating an example of a configuration of an information reproducing/recording unit that reads and writes information from and on a recording medium that is an optical disk.

As an example, FIG. 16 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 17:
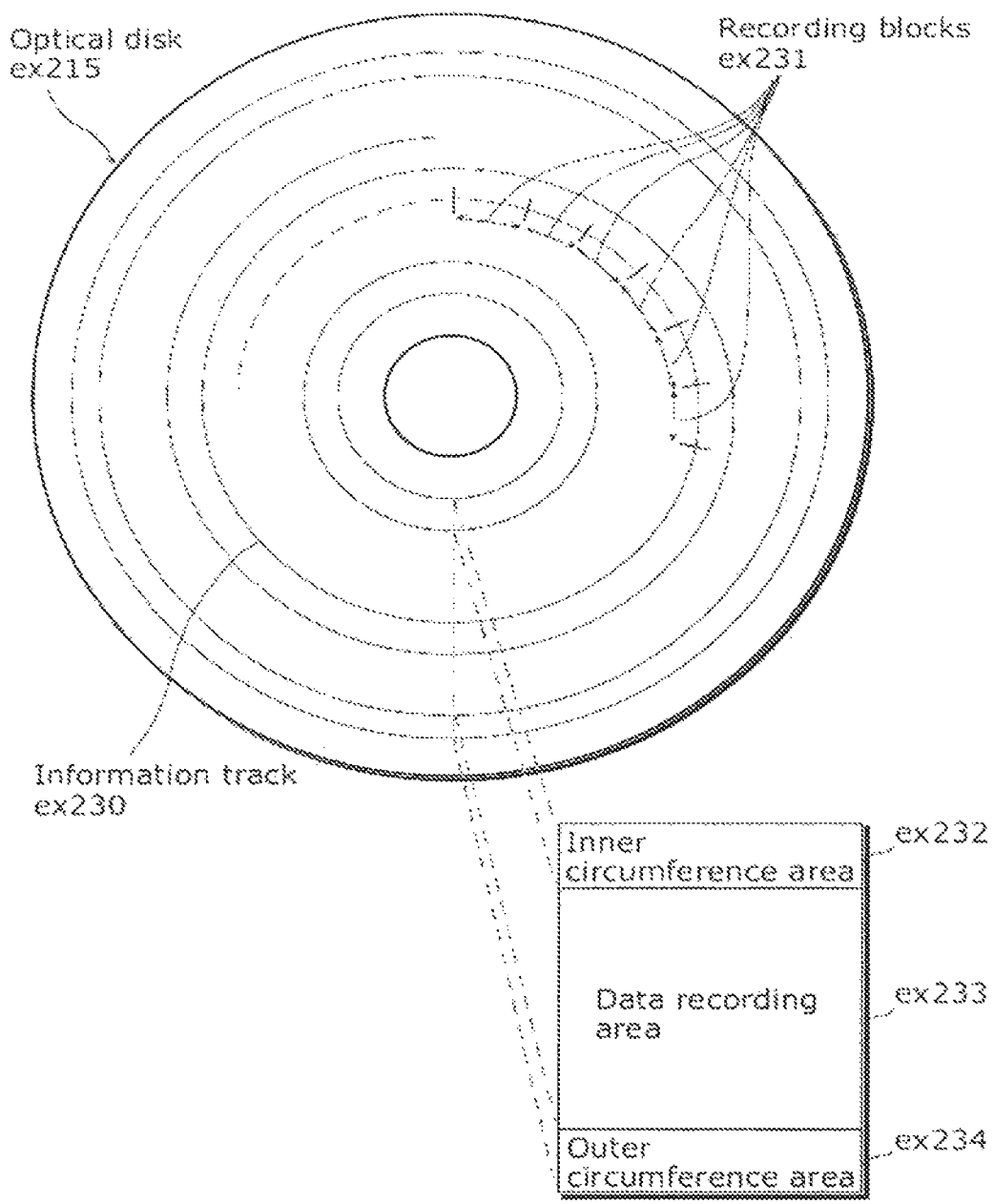
FIG. 17 shows an example of a configuration of a recording medium that is an optical disk.

FIG. 17 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 15. The same will be true for the configuration of the computer ex111, the cellular phone ex114, and others.

Figure 18A:
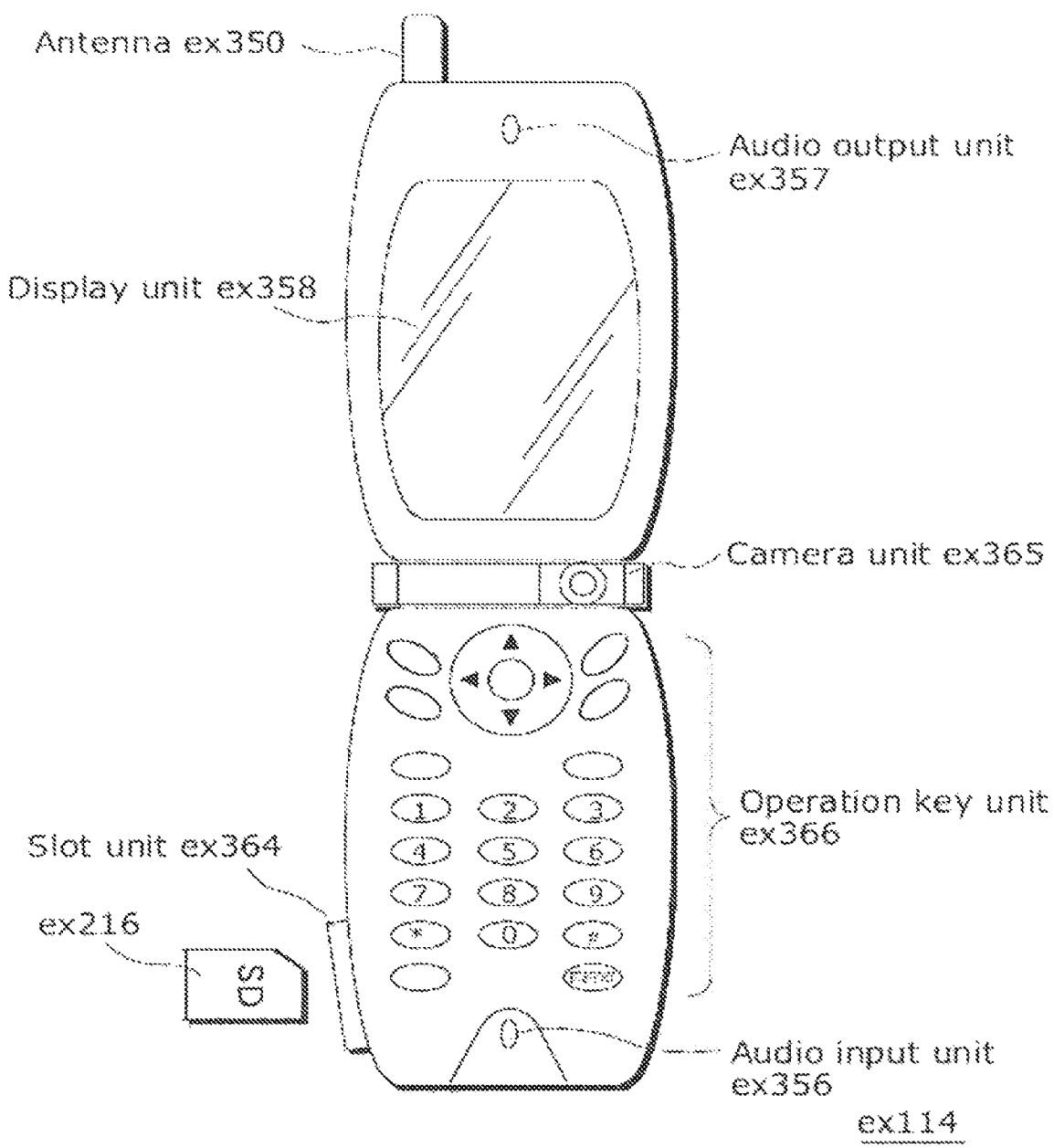
FIG. 18A shows an example of a cellular phone.

FIG. 18A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 18B:
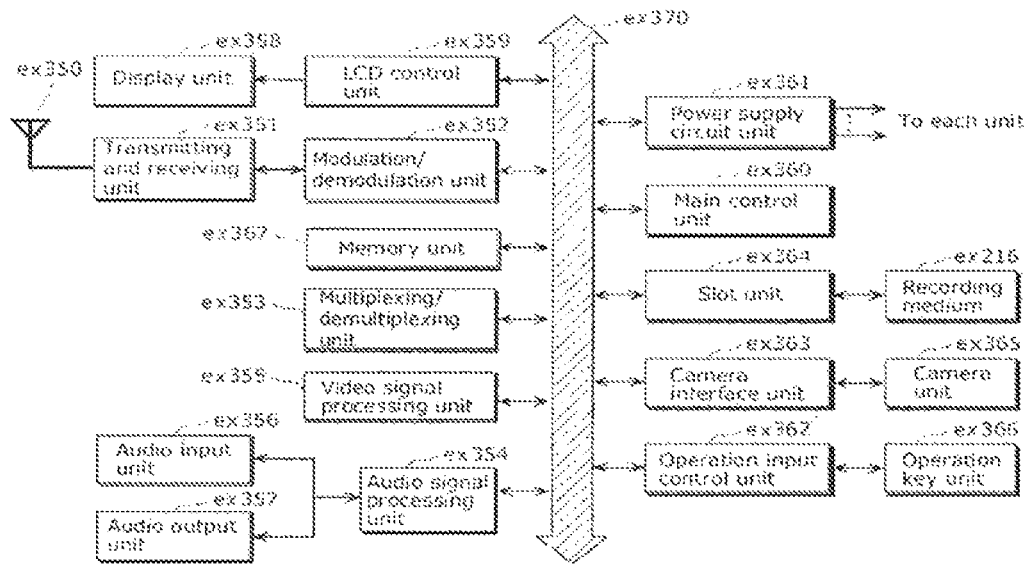
FIG. 18B is a block diagram showing an example of a configuration of a cellular phone.

Next, an example of a configuration of the cellular phone ex114 will be described with reference to FIG. 18B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment B

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 19:
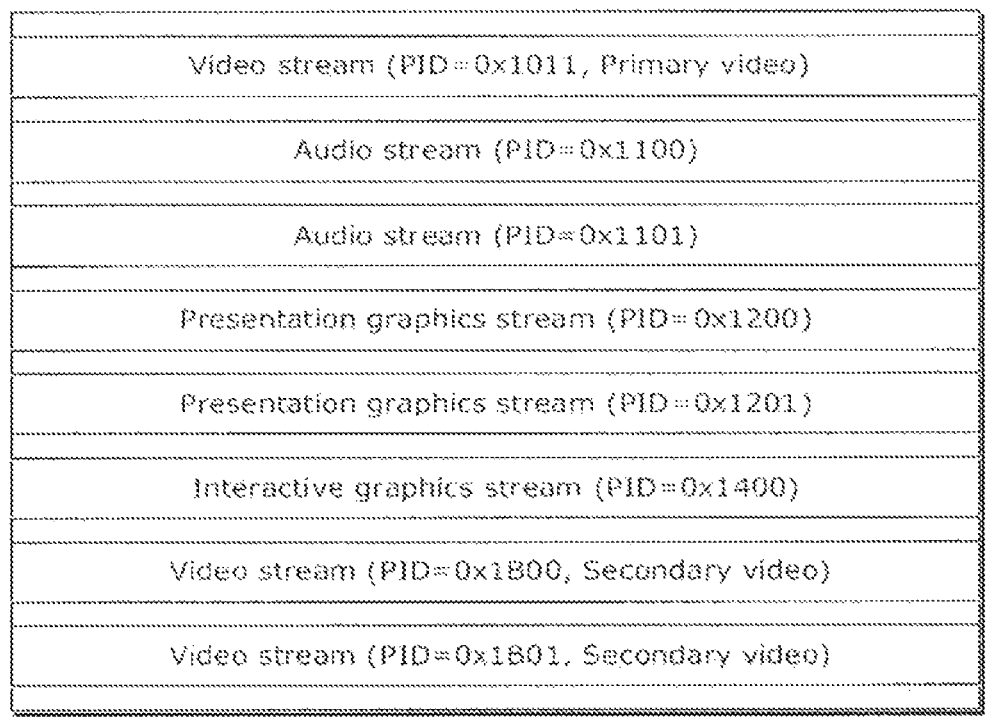
FIG. 19 illustrates a structure of multiplexed data.

FIG. 19 illustrates a structure of the multiplexed data. As illustrated in FIG. 19, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 20:
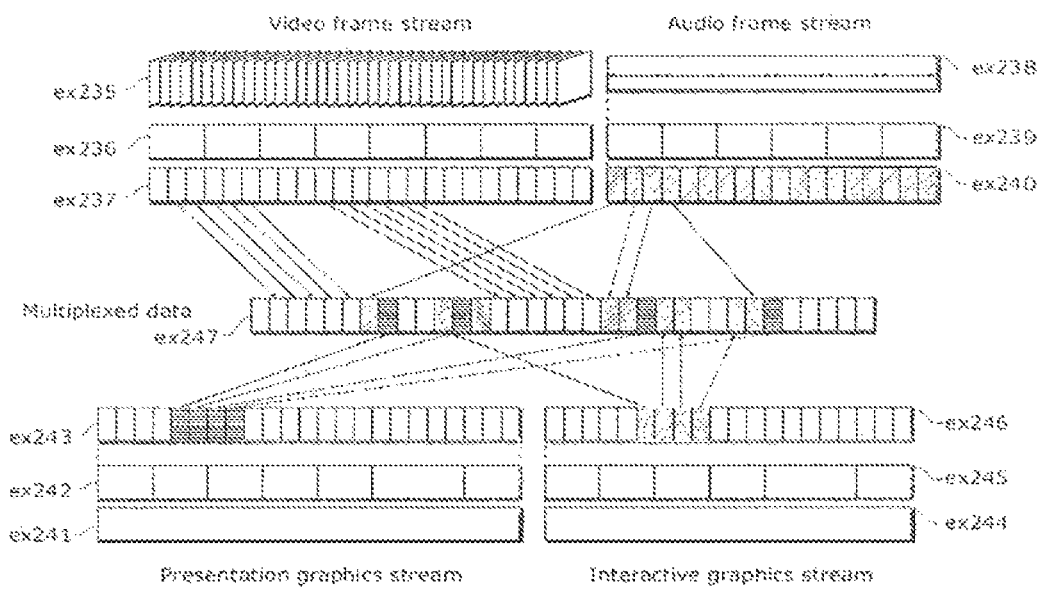
FIG. 20 schematically shows how each stream is multiplexed in multiplexed data.

FIG. 20 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 21:
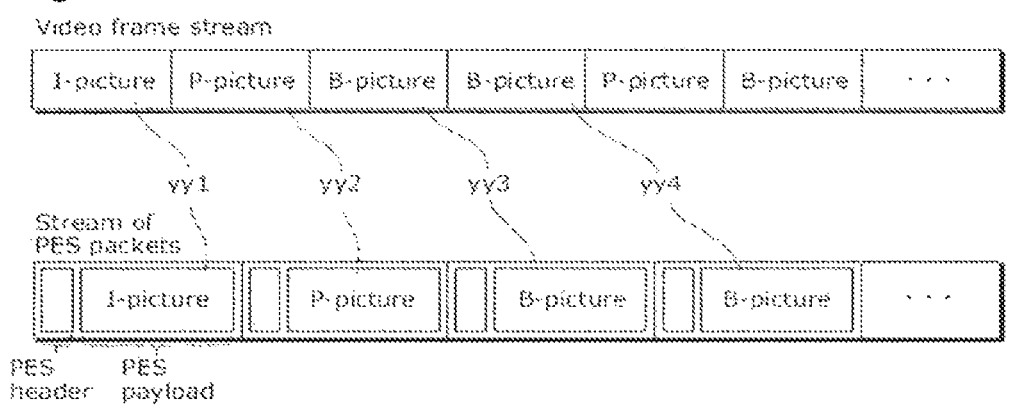
FIG. 21 shows how a video stream is stored in a stream of PES packets in more detail.

FIG. 21 illustrates how a video stream is stored in a stream of PES packets in more detail. The first bar in FIG. 21 shows a video frame stream in a video stream. The second bar shows the stream of PES packets. As indicated by arrows denoted as yy1, yy2, yy3, and yy4 in FIG. 21, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 22:
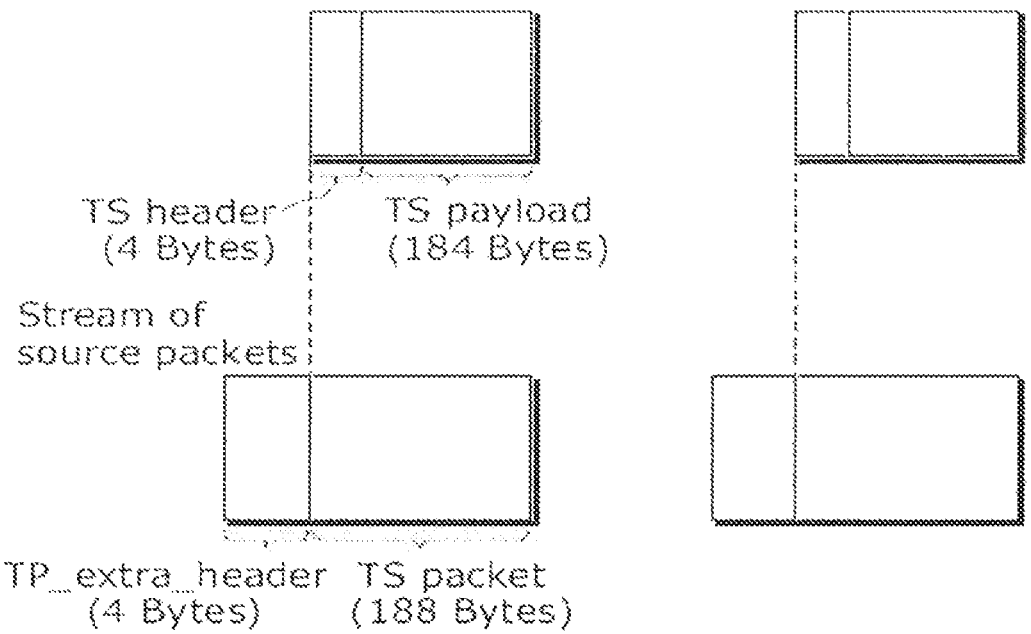
FIG. 22 shows a structure of TS packets and source packets in the multiplexed data.

FIG. 22 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 22. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 23:
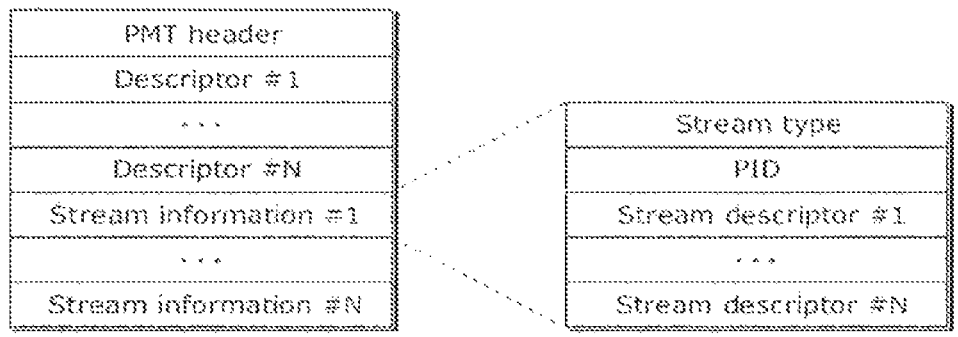
FIG. 23 shows a data structure of a PMT.

FIG. 23 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 24:
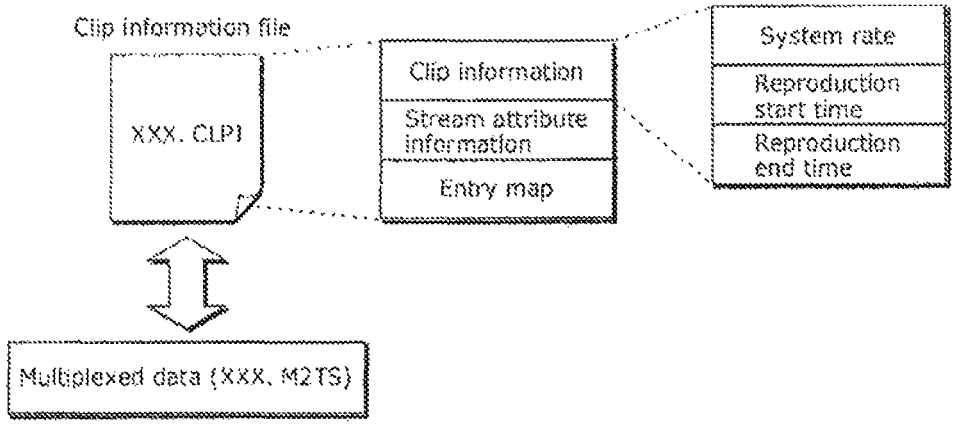
FIG. 24 shows an internal structure of multiplexed data information.

Each of the multiplexed data information files is management information of the multiplexed data as shown in FIG. 24. The multiplexed data information files are in one to one correspondence with the multiplexed data, and each of the files includes multiplexed data information, stream attribute information, and an entry map.

As illustrated in FIG. 24, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 25:
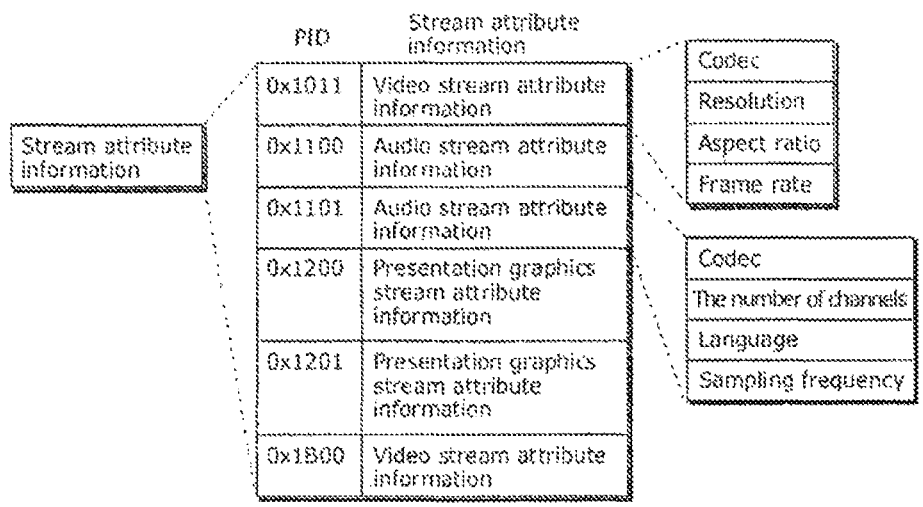
FIG. 25 shows an internal structure of stream attribute information.

As shown in FIG. 25, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 26:
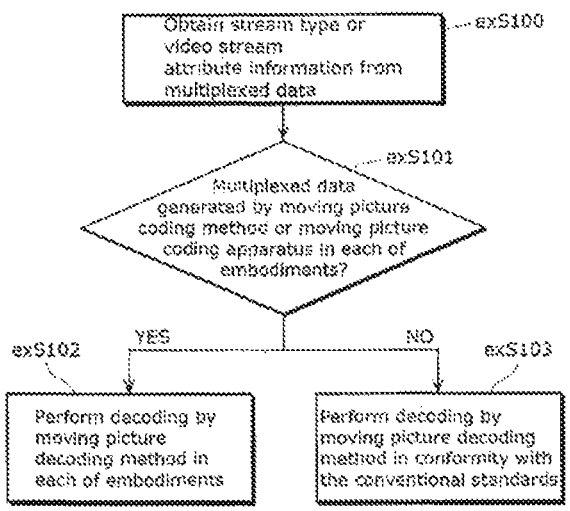
FIG. 26 shows steps for identifying video data.

Furthermore, FIG. 26 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment C

Figure 27:
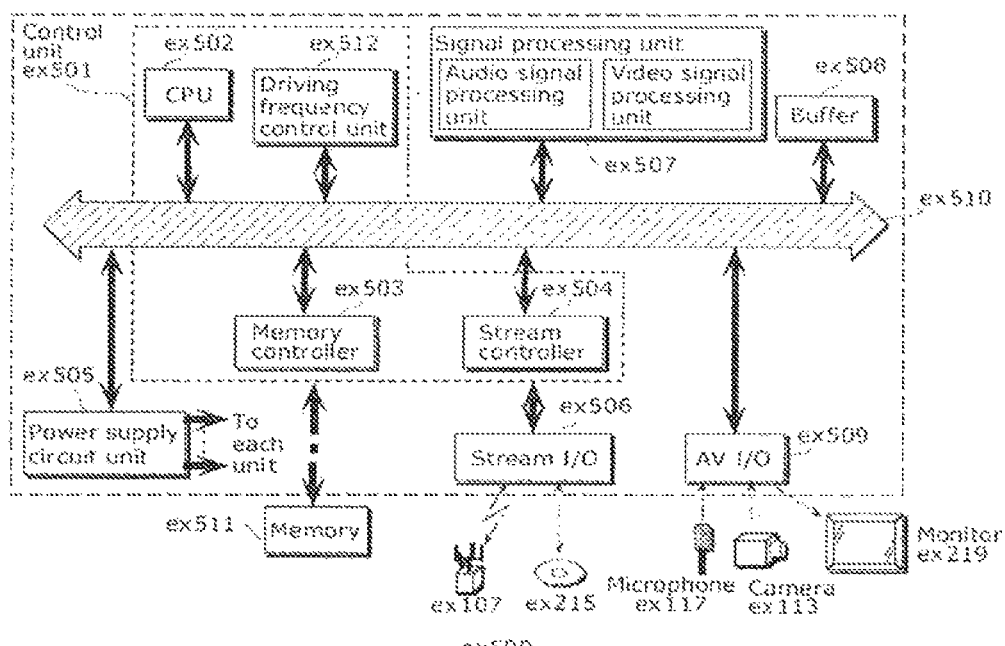
FIG. 27 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 27 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment D

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 28:
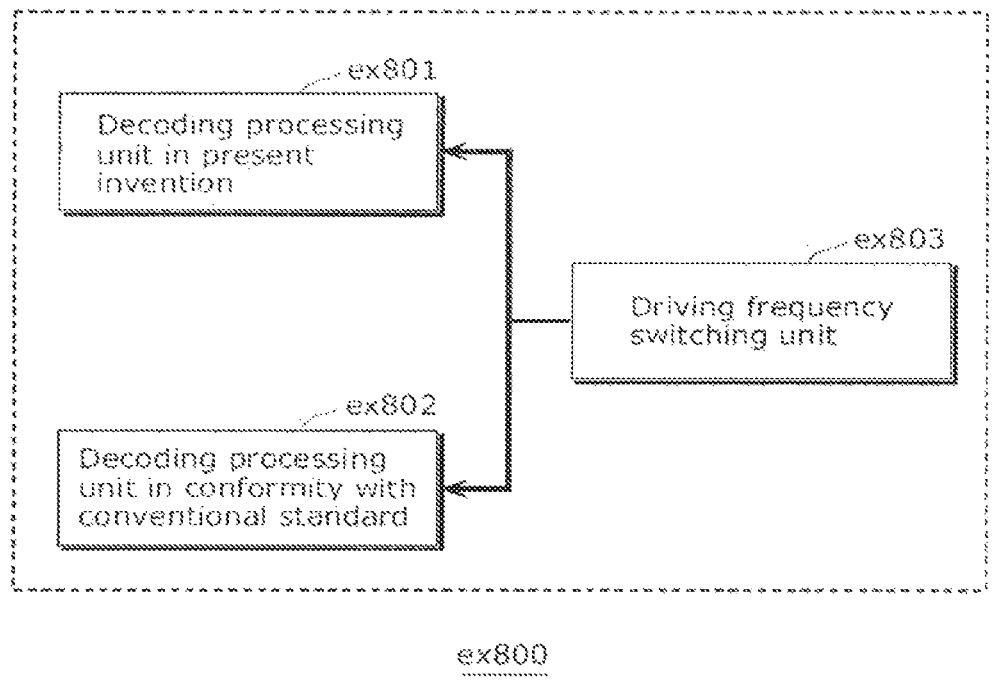
FIG. 28 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 28 illustrates a configuration ex800 in the present embodiment.

A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 27. Here, each of the decoding processing unit ex801 that executes the moving picture decoding method described in each of embodiments and the decoding processing unit ex802 that conforms to the conventional standard corresponds to the signal processing unit ex507 in FIG. 27. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 30. The driving frequency can be selected by storing the look-up table in the buffer ex508 and in an internal memory of an LSI, and with reference to the look-up table by the CPU ex502.

FIG. 29 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment E

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 31A:
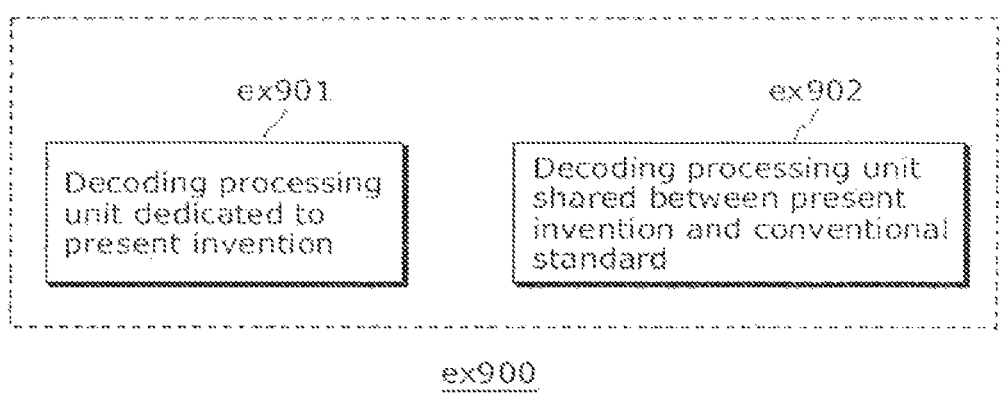
FIG. 31A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 31A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 31B:
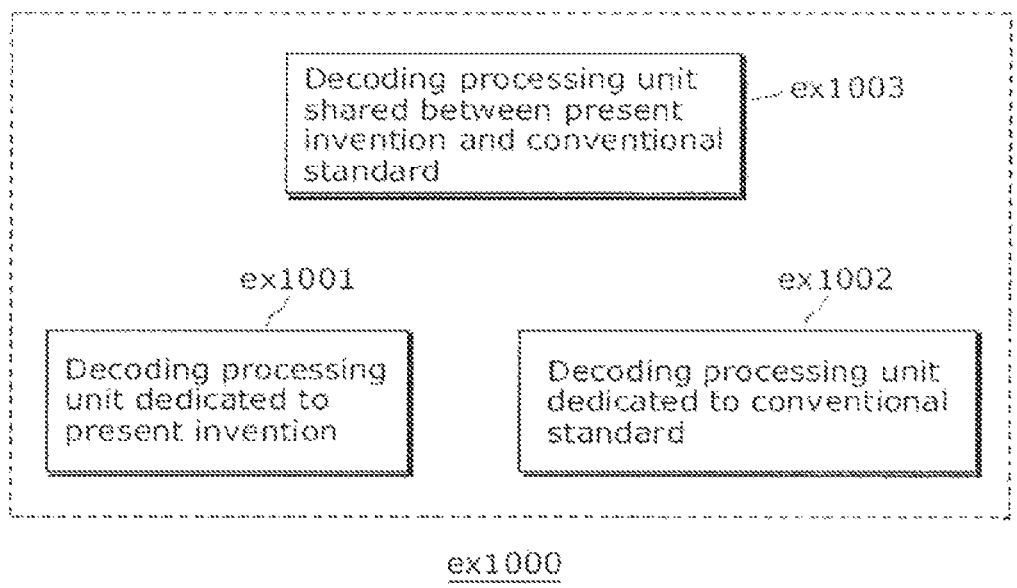
FIG. 31B is a diagram showing another example of a configuration for sharing a module of the signal processing unit.

Furthermore, ex1000 in FIG. 31B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

It will be appreciated by the person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

INDUSTRIAL APPLICABILITY

The present invention is applicable to a coding apparatus which codes audio, still images, and video and to a decoding apparatus which decodes data coded by the coding apparatus. For example, the present invention is applicable to various audio-visual devices such as audio devices, cellular phones, digital cameras, BD recorders, and digital televisions.

The invention claimed is:

1. A method of decoding a coded video bitstream with temporal motion vector prediction, the method comprising:
   parsing a flag from a header of a sub-picture unit or a header of a picture of the coded video; and
   determining whether the flag indicates that temporal motion vector prediction is used or not used;
   wherein if the flag indicates that temporal motion vector prediction is used, the method further comprises:
   creating a first list of motion vector predictors comprising a plurality of motion vector predictors derived from at least one motion vector from a collocated reference picture; and
   parsing a first parameter from the coded video bitstream which indicates a selected motion vector predictor out of the first list for a prediction unit in the sub-picture unit; and
   wherein if a POC value of the picture is determined to be greater than a predetermined value, the flag is set to indicate that temporal motion vector prediction is not used; otherwise, the flag is set to indicate that temporal motion vector prediction is used.

2. An apparatus for decoding a coded video bitstream with temporal motion vector prediction, the apparatus comprising:
   a processor; and
   a non-transitory memory having stored thereon executable instructions, which when executed by the processor, cause the processor to perform operations including:
   parsing a flag from a header of a sub-picture unit or a header of a picture of the coded video; and
   determining whether the flag indicates that temporal motion vector prediction is used or not used;
   wherein if the flag indicates that temporal motion vector prediction is used, the operations further include:
   creating a first list of motion vector predictors comprising a plurality of motion vector predictors derived from at least one motion vector from a collocated reference picture; and
   parsing a first parameter from the coded video bitstream which indicates a selected motion vector predictor out of the first list for a prediction unit in the sub-picture unit; and
   wherein if a POC value of the picture is determined to be greater than a predetermined value, the flag is set to indicate that temporal motion vector prediction is not used; otherwise, the flag is set to indicate that temporal motion vector prediction is used.

* * * * *